United States Patent [19]
Fang et al.

[11] 3,991,278
[45] Nov. 9, 1976

[54] LINE PROTECTION SWITCHING SYSTEM

[75] Inventors: Geng-Seng Fang, Matawan, N.J.;
William Joseph Mitchell, Jr., Andover, Mass.

[73] Assignee: Bell Telephone Laboratories, Incorporated, Murray Hill, N.J.

[22] Filed: June 13, 1975

[21] Appl. No.: 586,650

[52] U.S. Cl. .................... 179/15 BF; 179/175.3 S
[51] Int. Cl.² ...................................... H04J 3/14
[58] Field of Search..... 179/15 BF, 18 EA, 175.2 C, 179/175.25, 175.3 R, 175.31 R, 175.3 S; 325/2; 340/147 SC; 333/3

[56] References Cited
UNITED STATES PATENTS

| | | | |
|---|---|---|---|
| 2,680,162 | 6/1954 | Brehm | 340/147 SC |
| 3,111,624 | 11/1963 | Farkas | 340/147 SC |
| 3,681,694 | 8/1972 | Sarati | 325/2 |
| 3,870,955 | 3/1975 | Ouvrier | 325/2 |
| 3,878,463 | 4/1975 | Lanigan | 325/2 |

OTHER PUBLICATIONS
Bell System Technical Journal, "100A Protection Switching System", Dec. 1965; p. 2295.

*Primary Examiner*—David L. Stewart
*Attorney, Agent, or Firm*—Thomas Stafford

[57] ABSTRACT

Protection for service lines linking offices in a communications system is realized by linking the offices in a sequence with a serial connection of protection lines. Protection for service lines which bypass one or more of the offices in the serial sequence is achieved by automatically controllably cascading appropriate ones of the protection lines. The cascading of protection lines is realized on a nonhierarchical basis by assigning each service line in the system a unique address and by supplying a protection switch request message including the address of the requesting service line sequentially to each office in the serial sequence until the transmit-end of the requesting line is located. A switch is automatically effected by equipment located at the offices only if all the protection lines to be cascaded are available. The availability of the protection lines is indicated at each office and an indication thereof is included in the protection switch request message being propagated sequentially to the offices in the system.

15 Claims, 22 Drawing Figures

FIG. 3
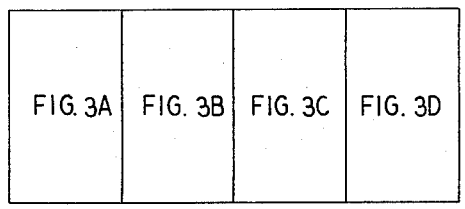
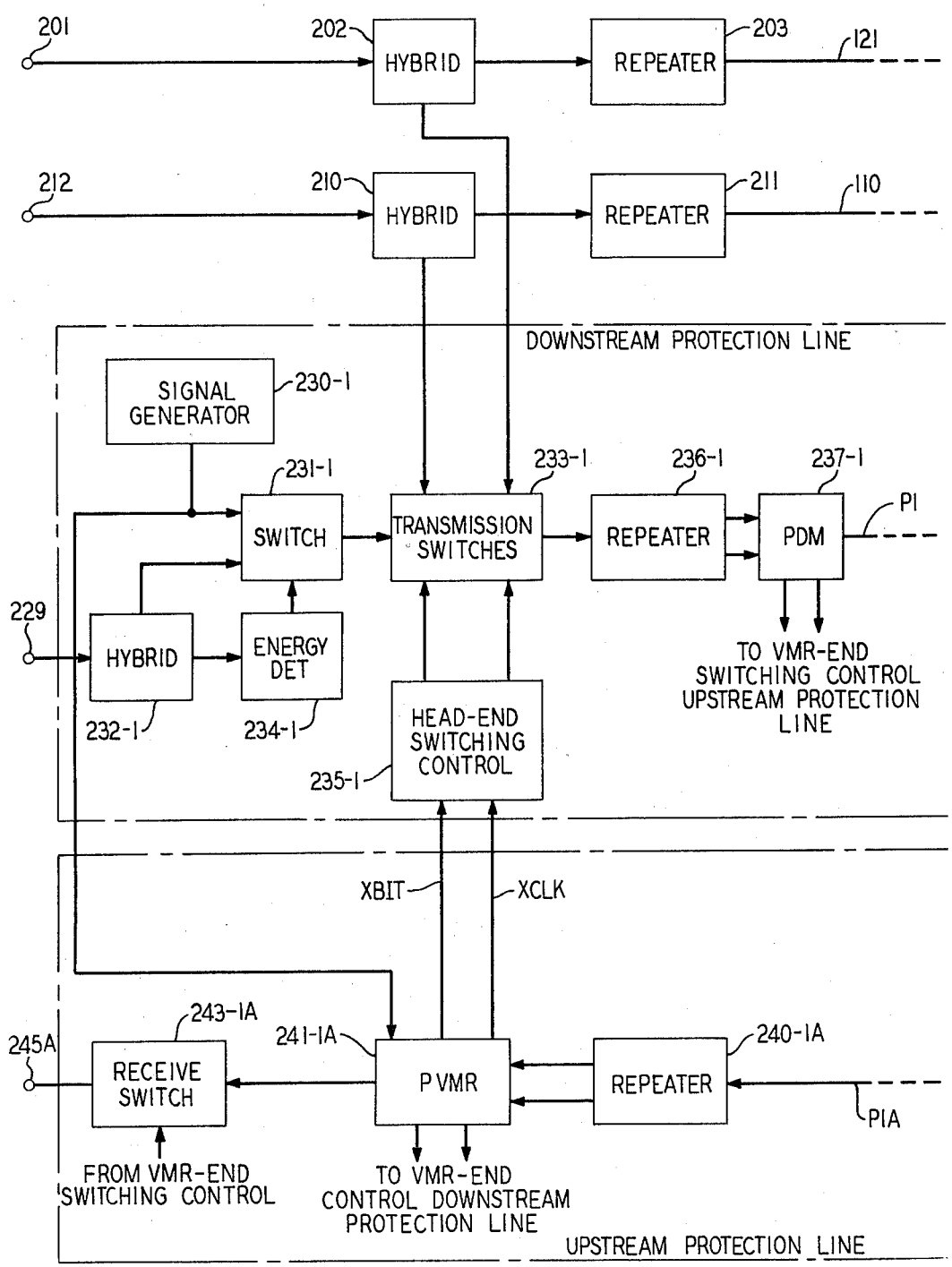
FIG. 3A
HEAD-END TRANSMIT TERMINAL 101

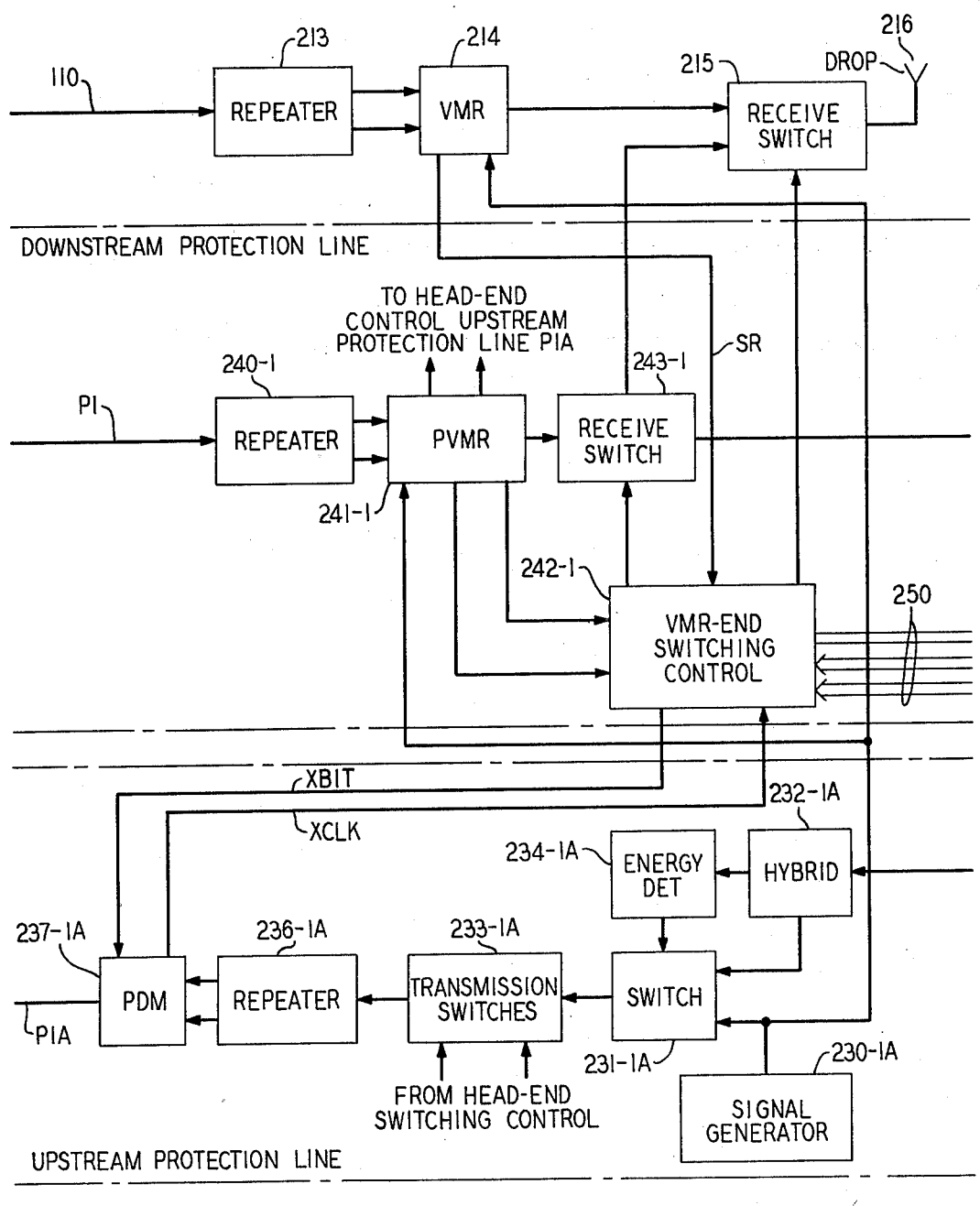

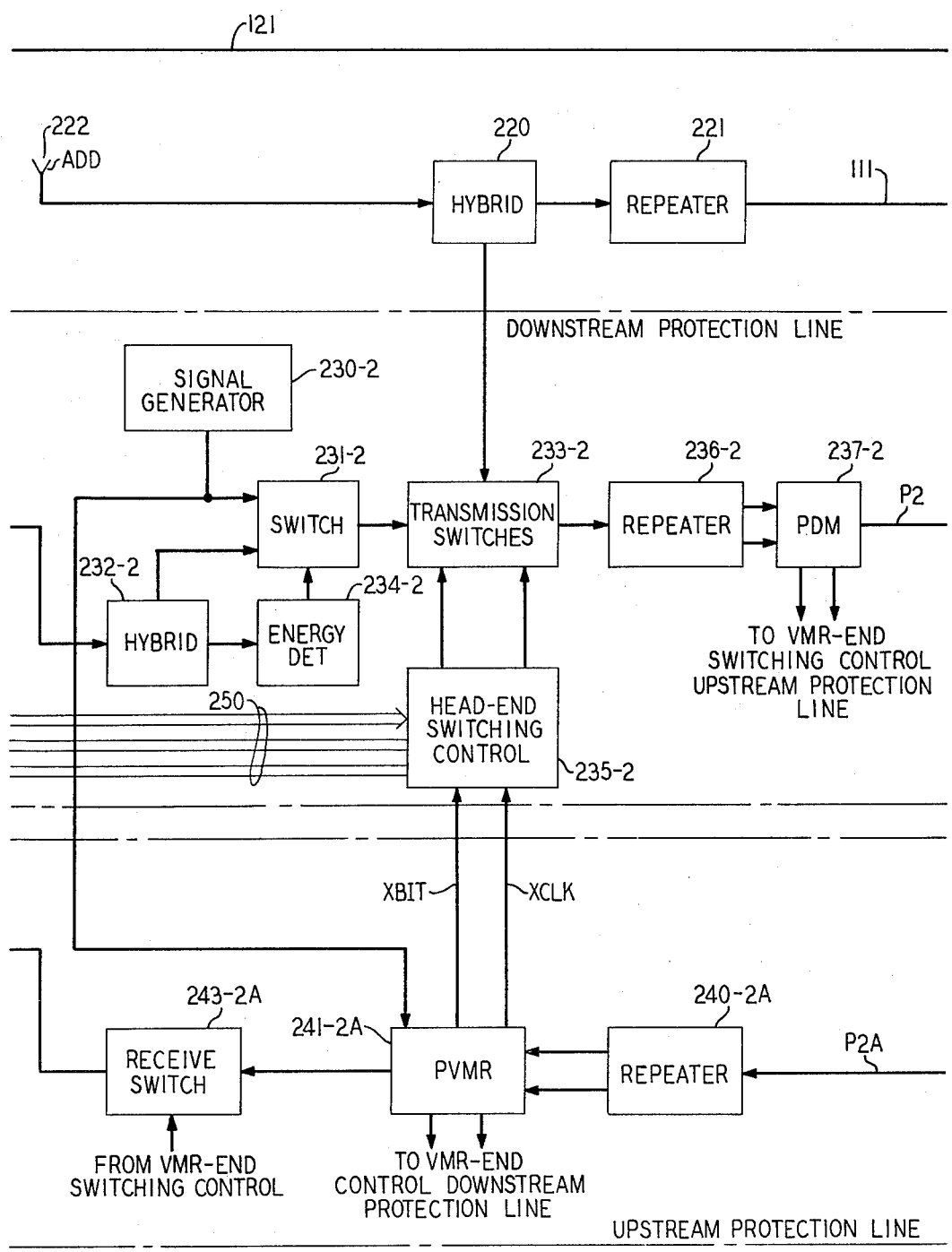

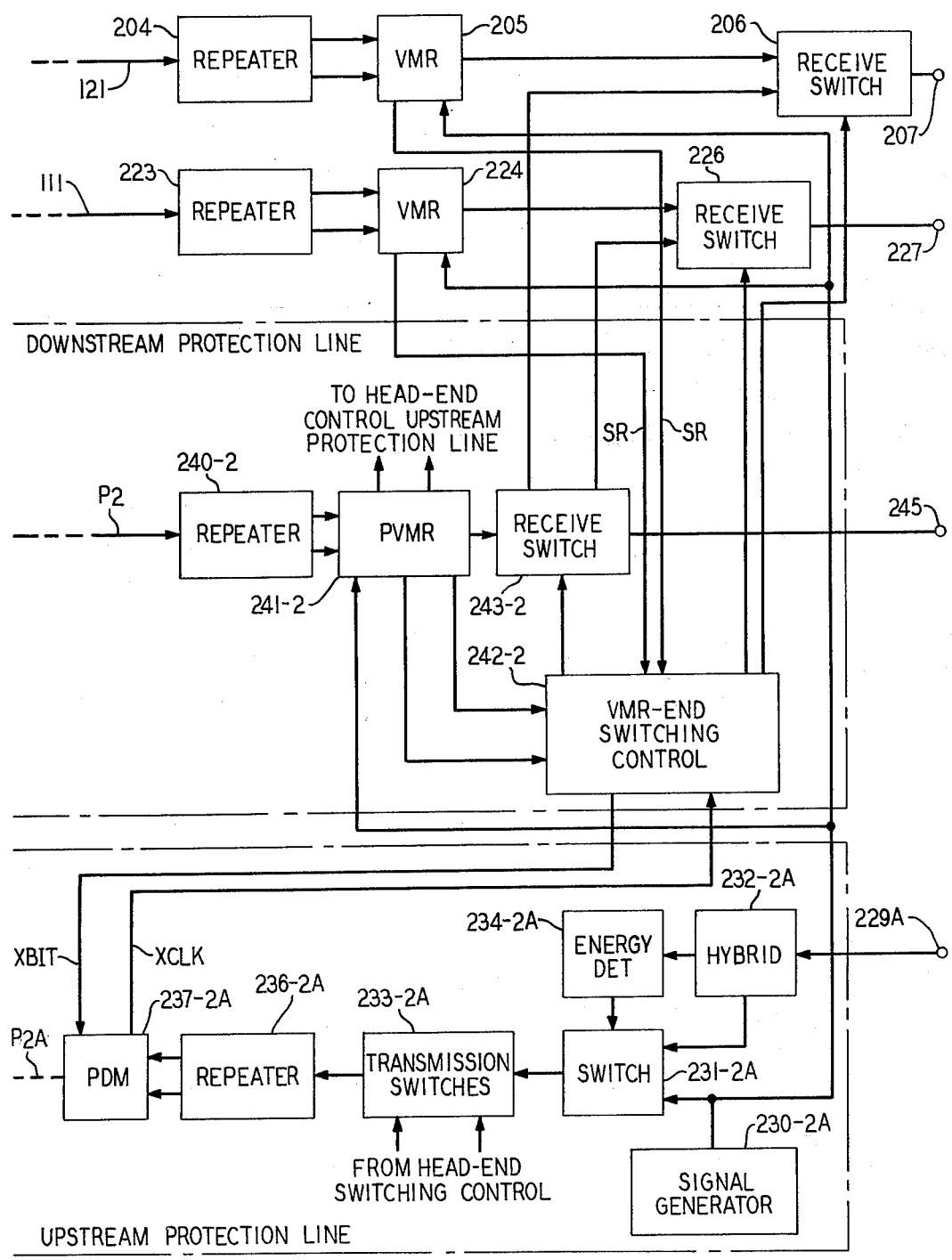

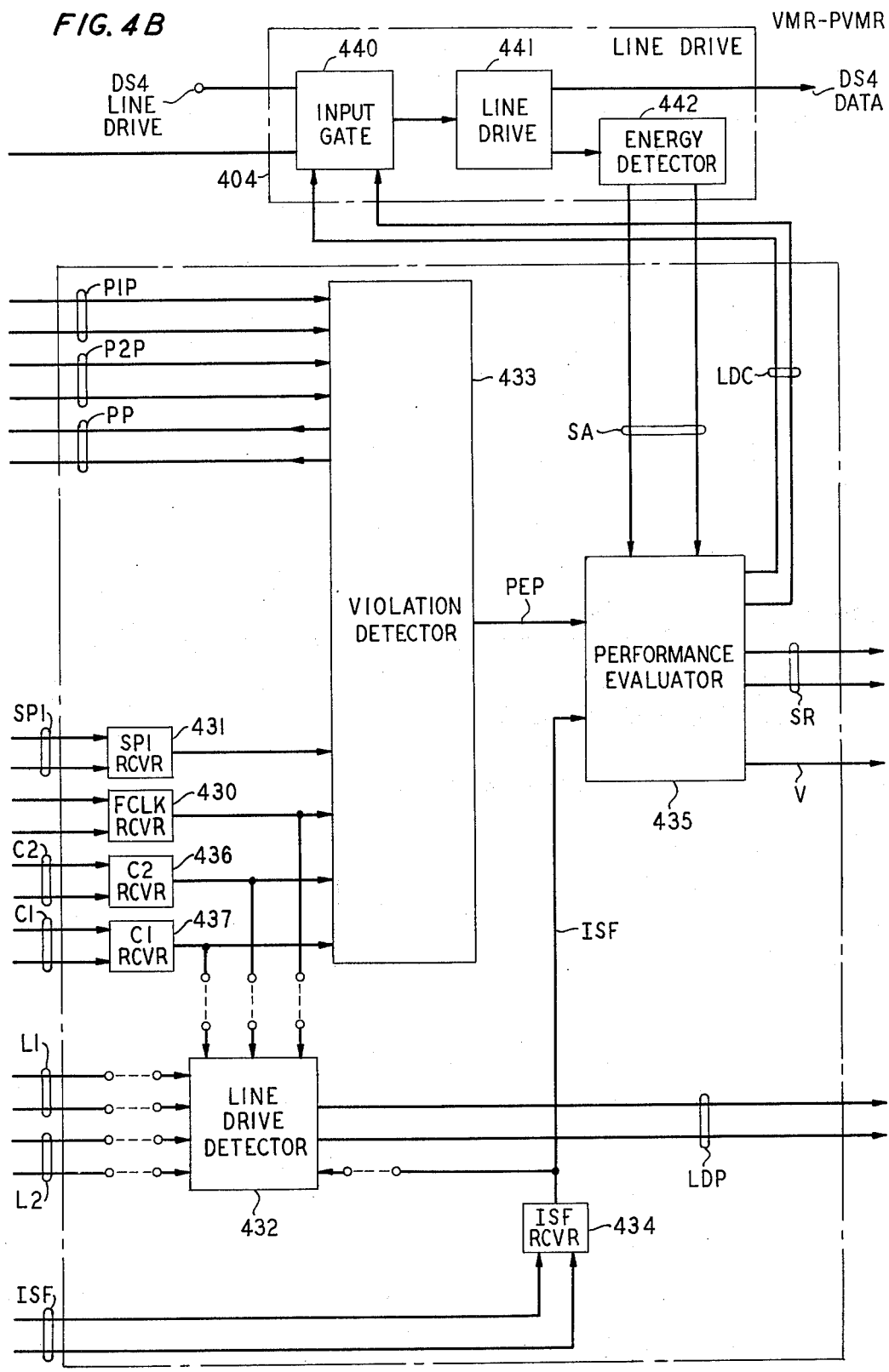

VMR-END SWITCHING CONTROL

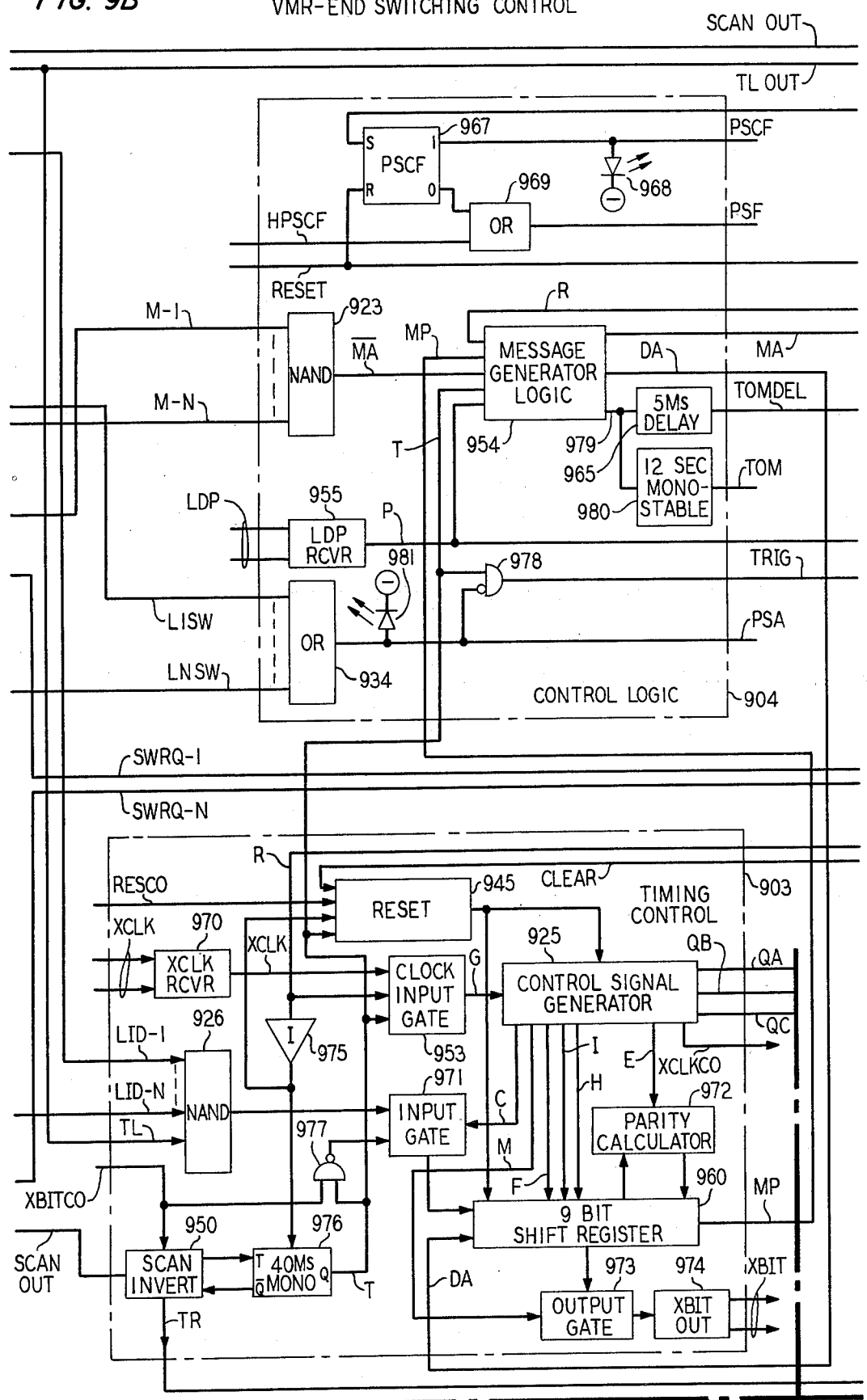
FIG. 9B  VMR-END SWITCHING CONTROL

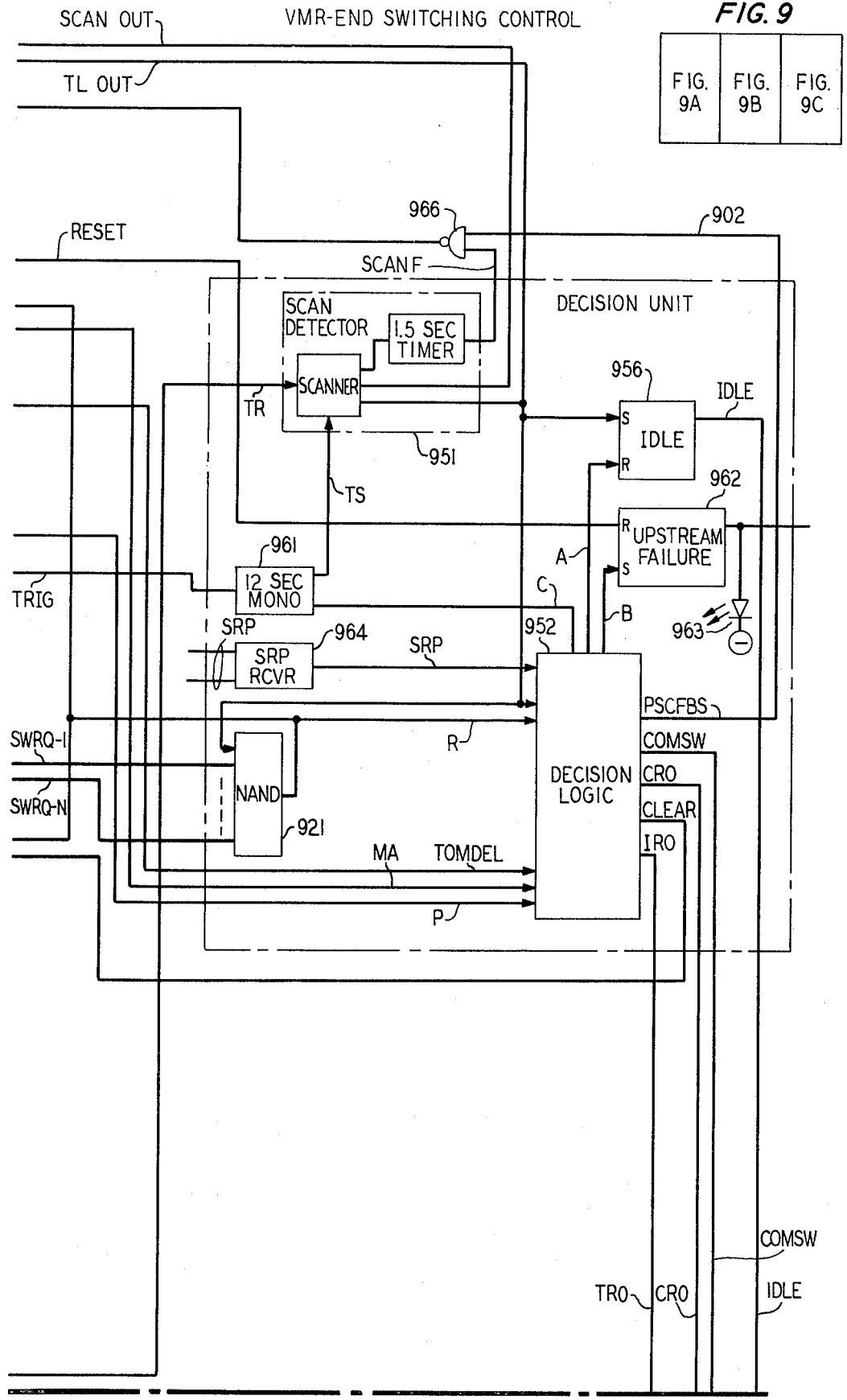

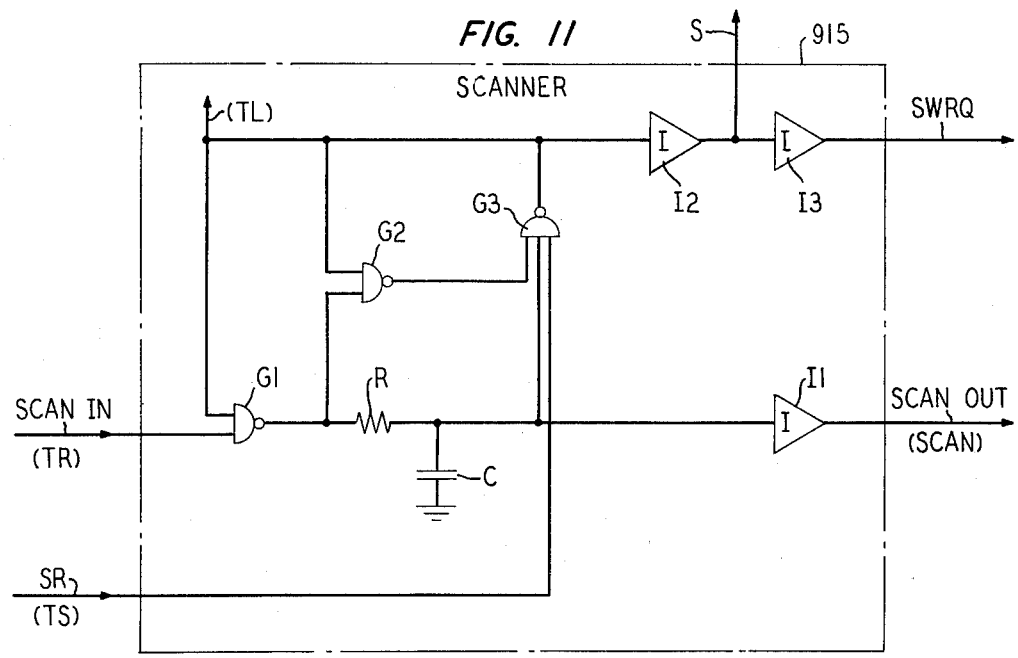
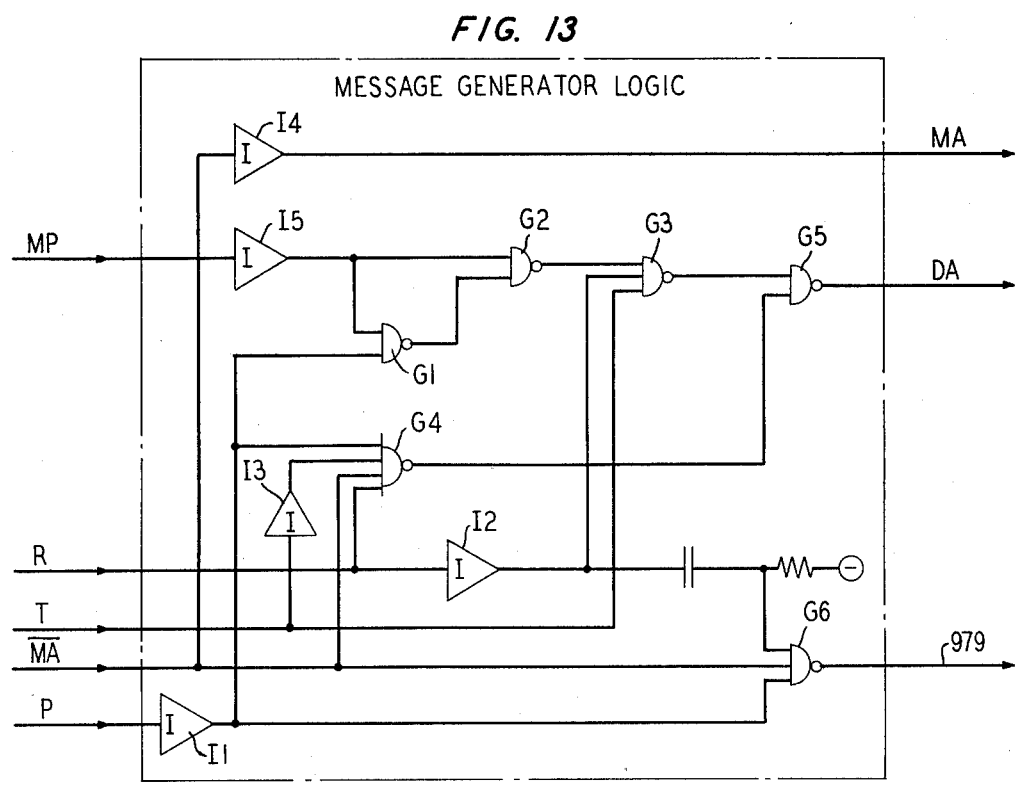

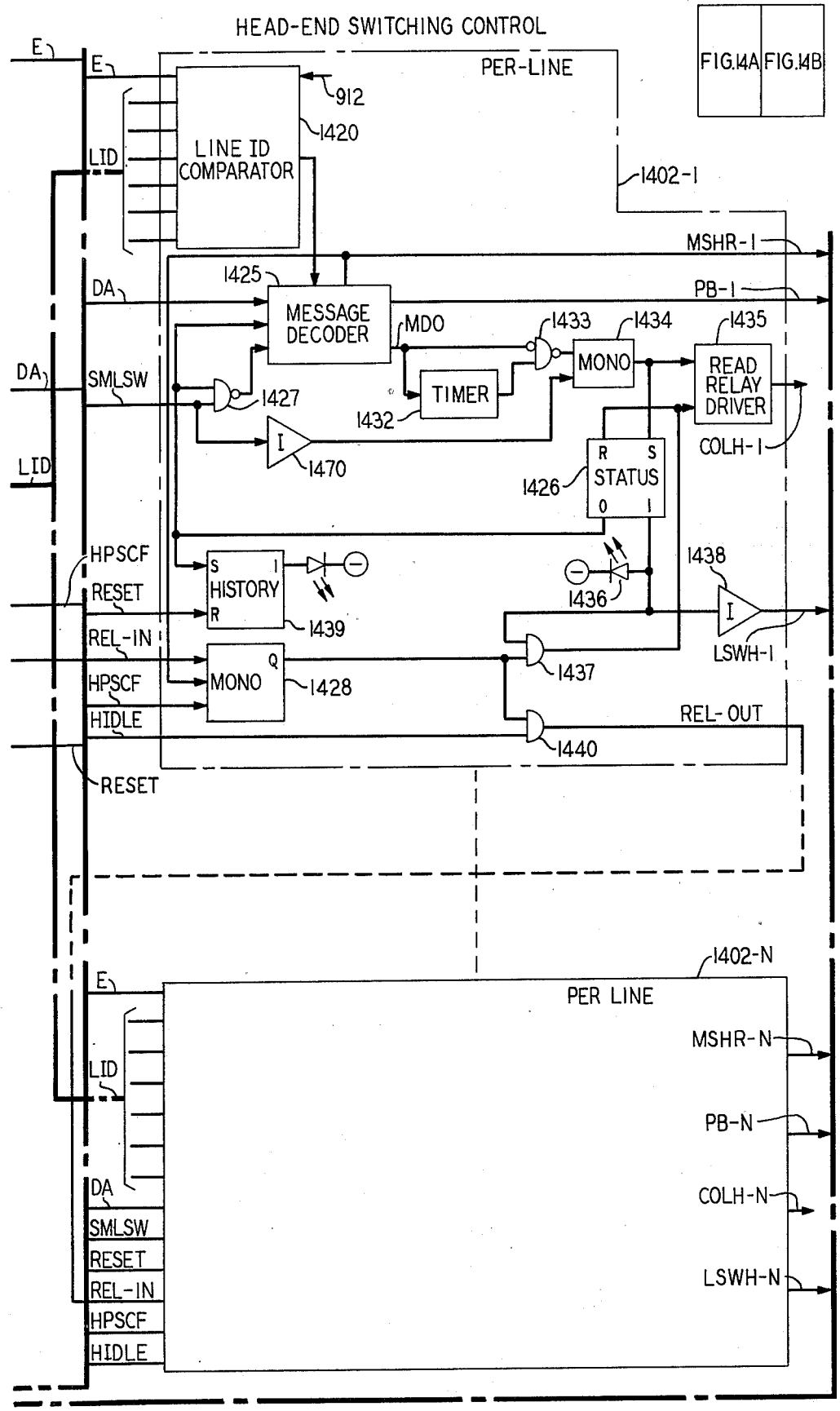

LINE PROTECTION SWITCHING SYSTEM

BACKGROUND OF THE INVENTION

This invention relates to automatic protection switching systems and, more particularly, to a protection switching system in which service lines and/or offices may be easily and economically added.

In communications systems, networks including service lines are employed to transmit signals between locations, for example, telephone offices. Some of these offices may be located intermediate to others of the offices. In modern communications systems, it is desirable to employ service lines which link the intermediate offices with each other and also service lines which by-pass one or more of the intermediate offices in linking others of the offices in the system together. In such systems, transmission reliability must be maintained at a "high" level. A desired reliability is realized by employing some form of protection against failure of service lines linking the intermediate offices directly as well as those service lines which by-pass one or more of the intermediate offices in linking others of the offices together. Heretofore, protection was generally provided on a so-called point-to-point basis. Consequently, separate protection lines or channels were provided for service lines directly linking intermediate offices and for service lines which by-pass one or more intermediate offices. Such protection arrangements are undesirable from both an economic as well as a system growth basis. Indeed, such protection systems require duplication of equipment and do not allow for easy and economical addition of new lines and/or offices to the overall communications system.

In one known system, the problems of the point-to-point protection switching systems are overcome by employing a first protection line between a first terminal and an intermediate office and a second protection line between the intermediate office and a second terminal. The first and second protection lines are arranged to be cascaded controllably to provide protection for service lines directly linking the first and second terminals in addition to providing protection for service lines linking the intermediate office with each of the terminals. The protection lines employed in this prior arrangement are of a type described in an article authored by H. D. Griffiths and J. Nedelka entitled "100A Protection Switching System" *Bell System Technical Journal*, December, 1965, page 2295. Cascading of the protection lines is achieved by employing a switch arrangement at the intermediate office. Voice frequency signals transmitted over a separate transmission facility are employed in the 100A system to control the intermediate switching arrangement for cascading the protection lines. When the protection lines are cascaded they provide protection for the lines directly linking the first and second terminals. When the protection lines are not cascaded, they are available to protect the associated service lines between the intermediate office and the first and second terminals. This prior known system is capable only of providing protection between the two terminals and one intermediate office. It is not readily expandable to include other intermediate offices and/or terminals without substantial re-engineering and substantial system modifications to effect desired cascading of multiple protection lines. The need for additional engineering and modification of equipment is undesirable. Moreover, use of a separate transmission facility to transmit signals to and from each terminal and the intermediate office in order to effect the desired switching is also undesirable.

More recently, a system has been proposed for providing alternate transmission channels when a channel fails. The alternate channels are provided by switching transmission from the failed channel to an alternate channel which may include one or more transmission links. The switching is controlled, however, from a central control center. Specifically, switch requests are transmitted to the control center where the availability of an alternate channel is checked and appropriate commands issued. Consequently, each switch location must be connected via a communications link to the control center. Such central control arrangements are hierarchical and usually dictate that the entire system topology and the status of each switch in the system be known at the control center. Furthermore, the control center must be appropriately programmed to effect the desired switching to alternate channels. Consequently, changes in the system topology may require alteration of the communications system between the control center and switch locations as well as reprogramming of the control center itself.

Thus, although prior known protection switching arrangements may function satisfactorily in some applications they are undesirable for others because of their limitations. Moreover, because of the rapid growth experienced in communications systems, it is highly desirable to deploy a system including protection switching in which both service line additions between existing offices and new office additions are easily and economically realized.

SUMMARY OF THE INVENTION

These and other problems are resolved in accordance with the inventive principles described herein in a communication system by employing a nonhierarchical automatic protection switching system. The system includes a plurality of offices which are linked by a serial connection of a plurality of protection lines. Protection for a faulted service line which by-pass one or more of the offices in the system is realized by controllably cascading an appropriate number of the protection lines between the transmit-end and receive-end of the faulted line. Nonhierarchical cascading of the protection lines is achieved by assigning each service line in a so-called maintenance span of a communications system a unique address and by transmitting a switch request message originated at the receive-end of the faulted line sequentially to each office in the serial connection until the transmit-end of the faulted line is located.

More specifically, a protection switch is achieved in one embodiment of the invention by employing logic located at each office of the system which is associated with the protection lines. The logic includes an arrangement having a common control and an individual element associated with the receive-end of each incoming service line, and an arrangement also having a common control and an individual element associated with the transmit-end of each outgoing service line. In intermediate offices the receive-end and transmit-end logic arrangements are interconnected for direct communication. A switch request is originated by a monitor at the receive-end of a service line and communicated to the receive-end logic. In turn, the logic generates a switch request message including the address of the requesting service line and the status of the incoming protection line. This switch request message is transmitted to the transmit-end logic associated with the incoming protection line located in the next upstream office. The transmit-end logic compares the address in the message to determine if the faulted service line originates in that office. If so, a switch is made. If not, the message is supplied directly to the receive-end logic associated with the next incoming protection line. The receive-end logic modifies the message to indicate the status, i.e., availability, of the next incoming protection line. Thereafter, the message is transmitted to the next transmit-end logic located in the next upstream office in the serial sequence. This process is repeated until the transmit-end of the faulted service line is located. Then, a transmit-end switch is made, provided that the switch request message indicates all of the protection lines are available. If one or more of the protection lines are not available, no switch is made. However, once all of the protection lines become available a protection switch will be automatically effected. Additionally, multiple service line failures may be protected so long as the service lines do not overlap.

In one embodiment of the invention the switch request message is a 9-bit digital word including a prefix bit, 6 address bits, a message bit and a parity bit. This switch message is originated at the receive-end of a faulted service line and includes the identity of the faulted line and the status of the incoming protection line. The switch message is multiplexed into predetermined bit positions of the "normal" signal being transmitted on a protection line in a direction opposite to that of the faulted service line. Since the protection lines employed to protect transmission in the opposite direction pass through all the offices in the system, they are advantageously employed to supply switch request messages sequentially to each of the offices in the communications system. At each office the transmission signal is demultiplexed to obtain the 9-bit switch message. Then, the address bits of the message are compared to determine if the transmit-end of the faulted line is located in that office. If a comparison is made and the outgoing protection line is available, a transmit-end switch of the line is effected. If a comparison is not made, the demultiplexed switch request message is supplied directly to the receive-end logic associated with the next incoming protection line. The receive-end logic modifies the message bit of the switch request message to indicate the status of the next incoming protection line. Thereafter, the switch request message is reinserted into the reverse direction protection line for transmission to the next office in the serial sequence. This process is repeated until the transmit-end of the faulted service line is located. Once a transmit-end switch is effected the requesting receive-end logic automatically makes a receive-end switch. This is realized by observing a change in a prescribed characteristic of the signal being transmitted via the protection lines. Consequently, controllable cascading of protection lines is automatically realized by utilization of logic located at each office in the system.

A feature of this embodiment of the invention is that a switch request message automatically originates at the receive-end of a faulted line and is propagated sequentially to each office in a system until the transmit-end of the requesting line is located. Consequently, protection switching is realized without a need for a central control. Additionally, since each service line in a maintenance span has a unique address, all that is required to add new lines or offices is the logic and monitoring equipment located at the offices to be associated with the receive-end and transmit-end of the new line. None of the existing logic or lines need be modified. Therefore, new service lines and offices are easily and inexpensively added to the communications system. Moreover, supplying the switch request messages sequentially to all the offices in the maintenance span via the normal signal being transmitted over the series connection of protection lines, unburdens the communication system because multiple messages need not be sent to each office. Similarly, supplying the demultiplexed switch request message in intermediate offices directly from the transmit-end logic to the receive-end logic effects savings in equipment and, additionally, unburdens the communications system because fewer switch messages need be transmitted.

BRIEF DESCRIPTION OF THE DRAWINGS

These and other objects and advantages of the invention will be more fully understood from the following detailed description of one embodiment of the invention taken in accordance with the appended drawings in which:

FIGS. 3A, 3B, 3C and 3D show in block diagram form portions of a system including one embodiment of the invention;

FIGS. 4A and 4B depict details of the violations monitor and remover (VMR) and protection violations monitor and remover (PVMR) employed in the system of FIG. 3;

FIGS. 9A, 9B and 9C depict details of the VMR-end switching control employed in the system of FIG. 3;

FIG. 11 shows details of a scanner employed in the VMR-end switching control of FIG. 9;

FIG. 13 shows details of the message generator logic used in the VMR-end switching control of FIG. 9;

FIGS. 14A and 14B show details of the head-end switching control employed in the system of FIG. 3.

DETAILED DESCRIPTION

General Description

Figure 1:
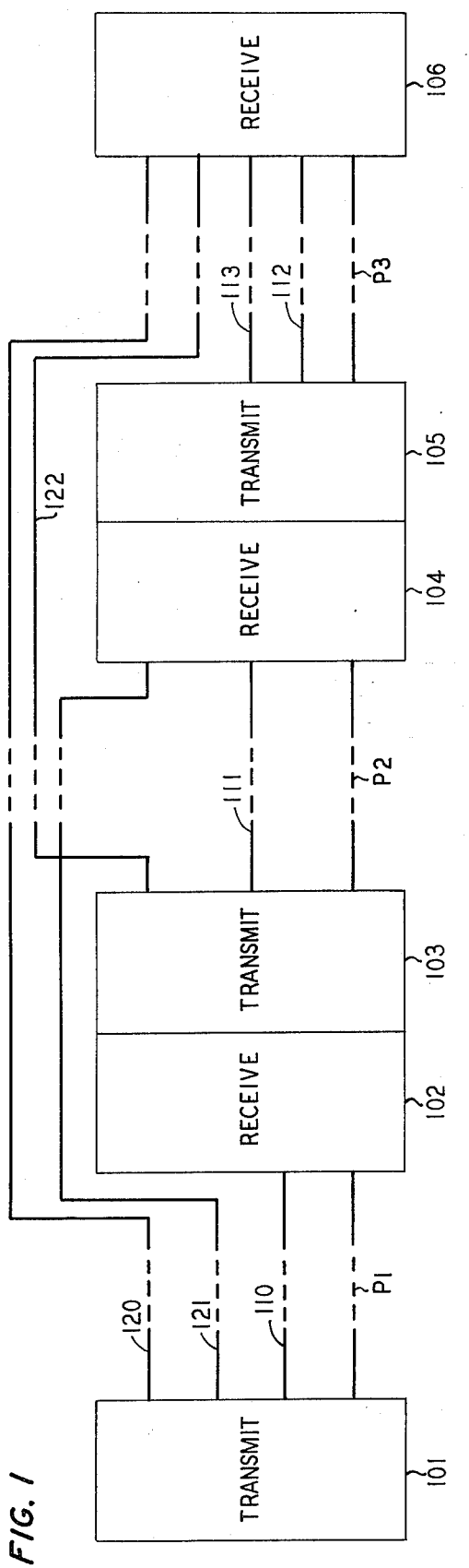
FIG. 1 is a simplified block diagram of a communications system in which the invention may be advantageously employed.

FIG. 1 illustrates in simplified block diagram form a portion of a communications system in which a line protection switching system including the present invention may be advantageously employed. For simplicity, only a portion of a so-called maintenance span of the system is show which is employed to transmit signals from left to right or so-called "downstream" transmission. It is to be understood that a system arrangement identical to the downstream transmission system shown is employed to transmit signals in the opposite direction, i.e., right-to-left or so-called "upstream" transmission. Additionally, a plurality of maintenance spans may be cascaded to form a communications system.

Accordingly, shown is head-end transmit terminal 101, first intermediate receive terminal 102, first intermediate transmit terminal 103, second intermediate receive terminal 104, second intermediate transmit terminal 105 and tail-end receive terminal 106. First intermediate receive and transmit terminals 102 and 103 are located in a first intermediate office and form a so-called "add-drop" office. Similarly, second intermediate receive and transmit terminal 104 and 105 are located in a second intermediate office and also form a so-called add-drop office. Each transmit and receive terminal is linked by a protection line or channel. The protection lines are arranged to link the offices in serial form. Thus, head-end transmit terminal 101 and receive terminal 102 are linked via protection line P1, transmit and receive terminals 103 and 104 are linked via protection line P2, and transmit and receive terminals 105 and 106 are linked via protection line P3. Again, it is important to note that protection lines P1, P2 and P3 are connected in series from head-end transmit terminal 101 through the intermediate add-drop terminals to tail-end receive terminal 106. Additionally, the protection lines linking the so-called upstream transmission portion of the communication system (not shown in FIG. 1) are advantageously employed for transmission of protection switching signals for controlling the substitution of protection lines P1–P3 in the downstream transmission portion of the system and vice versa, as will be further explained below.

Each transmit and receive terminal may be linked by one or more regular service lines, for example, transmit terminal 101 is linked via service line 110 to first intermediate receive terminal 102 where received signals are "dropped," i.e., supplied to a demultiplex unit for conversion into other signal streams or otherwise utilized as desired. Similarly, first intermediate transmit terminal 103 is linked via service line 111 to second intermediate receive terminal 104. Signals are added at transmit terminal 103 for transmission downstream to receive terminal 104 where they are dropped. In similar fashion, second intermediate transmit terminal 105 and tail-end receive terminal 106 are linked via regular service lines 112 and 113. Again, signals are added at terminal 105 and dropped at terminal 106 as in the other offices.

In prior known digital multiplex transmission systems, signals are transmitted from one transmit terminal to one receive terminal and intermediate offices cannot be by-passed without losing the ability to provide protection switching. Such system arrangements require, therefore, that each line be fully equipped in each intermediate office. Thus, for example, transmission from head-end transmit terminal 101 to tail-end receive terminal 106 requires office repeaters and the like at each intermediate office. It is advantageous from an equipment usage standpoint and, consequently, from an economic standpoint to link offices in a manner which does not require each intermediate office to be fully equipped for transmission of signals which are not to be terminated in that office. Thus, it is desirable to link directly the several offices in a system. Direct linking of offices eliminates the need for additional office equipment at each of the intermediate offices and also could effect savings in cable usage. Thus, in the instant communication system, head-end transmit terminal 101 is linked directly to tail-end receive terminal 106 via service line 120 and directly to second intermediate receive terminal 104 via service line 121. Similarly, first intermediate transmit terminal 103 is linked directly to tail-end receive terminal 106 via service line 122. Although the transmit and recieve terminals are shown as being linked by individual service lines, it is apparent that each transmit and receive terminal may, in practice, be linked by a plurality of service lines.

Because of the transmission capacity of each service line in communications systems of this type, it is important that each service line be provided some form of protection by way of substitution of a protection line for purposes of providing service in the event that the regular line or lines linking the terminals is faulted or otherwise goes out of service. As noted above, protection of transmission channels or lines in similar type communication systems has been realized by employing a central controller to effect switching from a faulted channel or line to alternate communications channels or lines to provide a link between desired transmit and receive terminals. Use of such a central controller is undesirable because of the need to know the system topology to program the controller in order to effect a desired substitution of alternate channels for a faulted channel.

Problems of prior known systems are overcome in the instant communications system by assigning each service line in the system a unique address code and by employing control and switching apparatus at each terminal in the system for effecting a desired substitution of one or more protection lines, for example, P1, P2 and/or P3, for a faulted or out-of-service regular service line. Information signals employed to effect the desired substitution of a protection line or lines are transmitted in predetermined bits of the normal system transmission signal format via the protection lines in the upstream portion of the communication system (not shown) sequentially to each of the upstream offices. Once the information signals including the address of the faulted service line reach an upstream office including the transmit terminal of the service line, a head-end switch is effected provided that none of the protection lines between the terminals of the requesting service line are already in use. Once the head-end switch is made, a change in the characteristic in the signal being transmitted via the downstream protection line or lines is employed at the tail-end of the service for which the protection lines are being substituted to realize a tail-end switch. Once the faulted or out-of-service line is restored to service, the protection line or lines are automatically restored to an idle state and are immediately available for substitution to protect any other line that has requested a protection switch.

Consider an example in which line 120 is out-of-service. Then, equipment at tail-end terminal 106 requests that a protection line be substituted. This substitution is initialized by transmitting a switch request signal including the address of line 120 via the upstream protection lines to all upstream offices. At each office, the address of service line 120 is compared to addresses of service lines originating in the office to determine if the transmit or head-end terminal of line 120 is in that office. If not, the protection switch request message is transmitted to the next subsequent upstream office where it is again examined and retransmitted upstream until the head-end of the line 120 is reached, in this example transmit terminal 101. Once the head-end terminal has been determined, a head-end switch is made diverting the incoming signals from line 120 to protection line P1. This switch is made provided that none of the intermediate protection lines, i.e., P2 and P3, are in use or otherwise busy. To this end, the switch message is examined at each office to determine the status of the downstream protection lines. Additionally, the message is also modified, if necessary, to indicate that a protection line terminated in the office is not available. Then, the switch message is transmitted to the next subsequent upstream office. Once the head-end switch is made, a change in characteristics of the signal being transmitted downstream via protection lines P1, P2 and P3 is employed in tail-end receive terminal 106 to effect a tail-end switch, thereby completing the substitution of a serial connection of protection lines P1, P2 and P3 for service line 120. If any or all of the protection lines are busy, equipment at tail-end office 106 would periodically repeat a request for a protection switch. Thus, as soon as protection lines P1, P2 and P3 become available they are substituted for service line 120. Similarly, protection lines P1 and P2 are available to be substituted for line 121, while protection lines P2 and P3 are available for protection of service line 122. Again, we must emphasize if a protection line is in use, for example, line P2 substituted for service line 111, it is not available for substitution for other out-of-service lines. Consequently, protection of those other lines, for example, 120, 121 or 122 cannot be realized until service line 111 is restored, thereby freeing protection line P2. However, service lines 112 and 113 may be protected by P3 while service line 110 is protected by P1.

Figure 2:
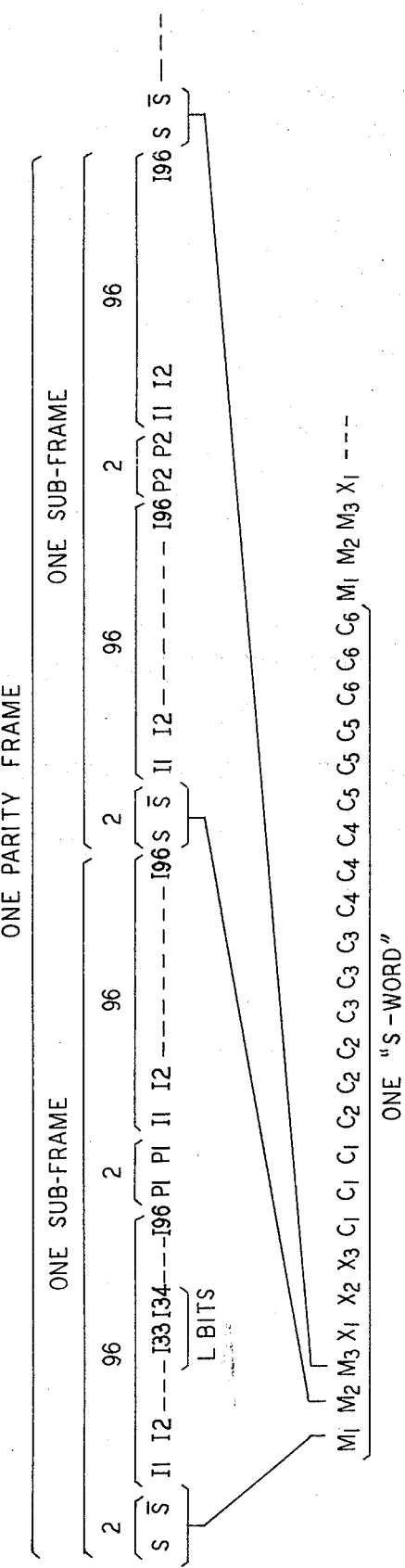
FIG. 2 depicts a bitstream pattern useful in describing operation of a system employing the invention.

The present invention may be advantageously employed in a high capacity digital transmission system of a type employing the so-called DS4 signal format, for example, the T4M carrier system. The DS4 bit stream format, as illustrated in FIG. 2, is generated by an M34 multiplex unit or by a separate DS4 signal generator. The DS4 signal generator yields a signal having a format identical to that derived from the M34 multiplex except that pseudorandom bits are inserted in the pulse positions normally occupied by data bits. A scrambler circuit suitable for generation of the pseudorandom pulses which are inserted in the DS4 signal is described in copending application Ser. No. 450.171 filed Mar. 11, 1974 now U.S. Pat. No. 3,920,894, issued Nov. 18, 1975.

The DS4 signal format is shown in FIG. 2. Accordingly, 196 bits beginning with S and its complement $\bar{S}$ form one "subframe". Each subframe includes two groups of 96 data bits separated by a pair of parity bits. Two consecutive subframes, one including parity bits P1P1 and ending with one including parity bits P2P2 form a parity frame. Each pair of bits P1P1 transmits parity information for the ODD information bits I1, I3, etc., in the preceding parity frame. Similarly, each pair of bits P2P2 transmits parity information for the EVEN information bits I2, I4, etc., in the preceding parity frame. When the DS4 signal format is generated by a DS4 signal generator, bits 133 and 134 in each block of 96 data bits are assigned as fixed L bits and are transmitted as logical O's to identify the DS4 signal as a special line drive signal for protection switching purposes. Twenty-four subframes form one so-called superframe. The S-bits in one superframe form a 24-bit "S word" wherein M1, M2, M3 are always logical 101 and, therefore, identify or mark the start of an S word, and X1, X2, X3 are always either logical 000 or 111 and are used for transmitting protection switching messages. Further details relating to the DS4 signal format and its generation are discussed in U.S. Pat. No. 3,872,257 issued Mar. 18, 1975 to W. H. Bleickardt and R. B. Robrock, II.

FIGS. 3A, 3B, 3C and 3D assembled as shown in FIG. 3 depict in simplified block diagram form apparatus located at a number of transmit and receive terminals for effecting a substitution of one or more protection lines for one or more regular service lines. For clarity and simplicity of description, head-end transmit terminal 101, intermediate receive (drop) terminal 102, intermediate transmit (add) terminal 103 and receive terminal 104 only are shown. Additionally, only portions of the upstream protection lines are disclosed which are deemed necessary for an understanding of the principles of the instant invention. It being understood that the upstream protection lines linking a head-end upstream transmit terminal with a tail-end upstream receive terminal include apparatus which is essentially identical to the downstream protection lines interconnecting the downstream transmit and receive terminals.

Accordingly, transmit terminal 101 is linked via line 121 to receive terminal 104. Signals from a multiplex unit having a DS4 format are supplied, i.e., added, via ADD terminal 201 and normally supplied via hybrid 202, transmit regenerative repeater 203 and repeatered line 121 to receive terminal 104. Receive terminal 104 includes receive regenerative repeater 204 which derives both data and clock signal from the incoming DS4 signal. In this example, the data and clock signals are at the T4M transmission rate which is approximately 274 megabits per second and approximately 274 megahertz, respectively. In turn, the data and clock signals are supplied to violations monitor and remover (VMR) unit 205.

VMR 205 performs several functions, namely, monitors quality of transmission, guarantees the "integrity" of its DS4 output signal, and requests a protection switch at the receive terminal. The VMR also is employed to supply a DS4 line drive signal to its output when the incoming signal has certain undesirable characteristics. This minimizes the possibility of downstream service lines erroneously requesting protection switches and aids in sectionalizing faults. That is to say, the DS4 line drive signal appears to be a "good" signal to downstream offices. Details of the VMR unit are shown in FIG. 4 and are discussed in detail below. VMR arrangements have heretofore been employed to monitor service lines and request a protection switch. One such VMR is employed in the T2 transmission system. The output from VMR 205 is a DS4 format signal which is normally supplied via receive switch 206 to output terminal 207 where the signal is dropped, i.e., supplied to an M34 demultiplex unit.

Each regular service line linking a transmit and receive terminal includes essentially the same service line equipment at the transmit and receive terminals as line 121. Thus, transmit terminal 101 includes hybrid 210 and transmit regenerative repeater 211 for supplying a DS4 signal from ADD terminal 212 via line 110 to receive terminal 102. Since signals transmitted over line 110 are dropped at terminal 102, receive regenerative repeater 213 is employed in conjunction with VMR 214 to supply a DS4 signal via receive switch 215 to DROP terminal 216. Similarly, intermediate transmit terminal 103 includes hybrid 220 and transmit regenerative repeater 221 for supplying signals from ADD terminal 222 via regular service line 111 to tail-end receive terminal 104. Again, receive terminal 104 includes receive regenerative repeater 223 and VMR 224 for normally supplying the received DS4 signal via receive switch 226 to DROP terminal 227.

Each downstream protection line, for example, lines P1 and P2, employs substantially identical equipment. However, the add-drop intermediate offices are equipped for direct communication of certain signals between the protection switching equipment for purposes, in accordance with an aspect of the invention, of effecting substitution of a plurality of protection lines to protect a regular service line such as line 121. Similarly, the protection lines employed in the upstream transmission system also employ essentially identical equipment. Therefore, equipment units which are identical are labeled with similar numbers. The equipment used in protection line P1 being designated −1 while the equipment utilized in protection line P2 is designated −2. The equipment employed in the upstream protection lines which is identical to that used in the downstream lines is identified with a similar number followed by A.

Accordingly, transmit terminal 101 includes the transmit or so-called head-end equipment employed in protection line P1. Signal generator 230-1 generates a DS4 line drive signal including L bits as described above in relation to FIG. 2. Switch 231-1 is employed to connect signal generator 230-1 or hybrid 232-1 to transmission switches 233-1. Hybrid 232-1 is employed to supply a signal from an upstream source, if one is present, to transmission switches 233-1. Energy detector 234-1 is employed to detect the presence of such an upstream signal on an output leg of hybrid 232-1. When the signal level from hybrid 232-1 is above a predetermined threshold, energy detector 234-1 yields a signal for controlling switch 231-1 to disconnect DS4 signal generator 230-1 and to connect the bridging leg of hybrid 232-1 to transmission switches 233-1. Switch 231-1 is also arranged to terminate properly generator 230-1 in well-known fashion. Similarly, the bridging legs of hybrids 202 and 210 of service lines 121 and 110, respectively, are also connected to individual ones of transmission switches 233-1.

Transmission switches 233-1, under control of head-end switching control unit 235-1, are employed to effect a so-called head-end switch of the service lines, for example, line 121 or line 110 to the head-end of protection line P1. Both switch 231-1 and switches 233-1 may be any one of types now well known in the art as long as they preserve impedance matching upon switching. Preferably, they are of the coaxial remnant reed relay type and are arranged, in addition to effecting the desired switches, to terminate properly the lines and hybrids in well-known fashion.

Figure 6:
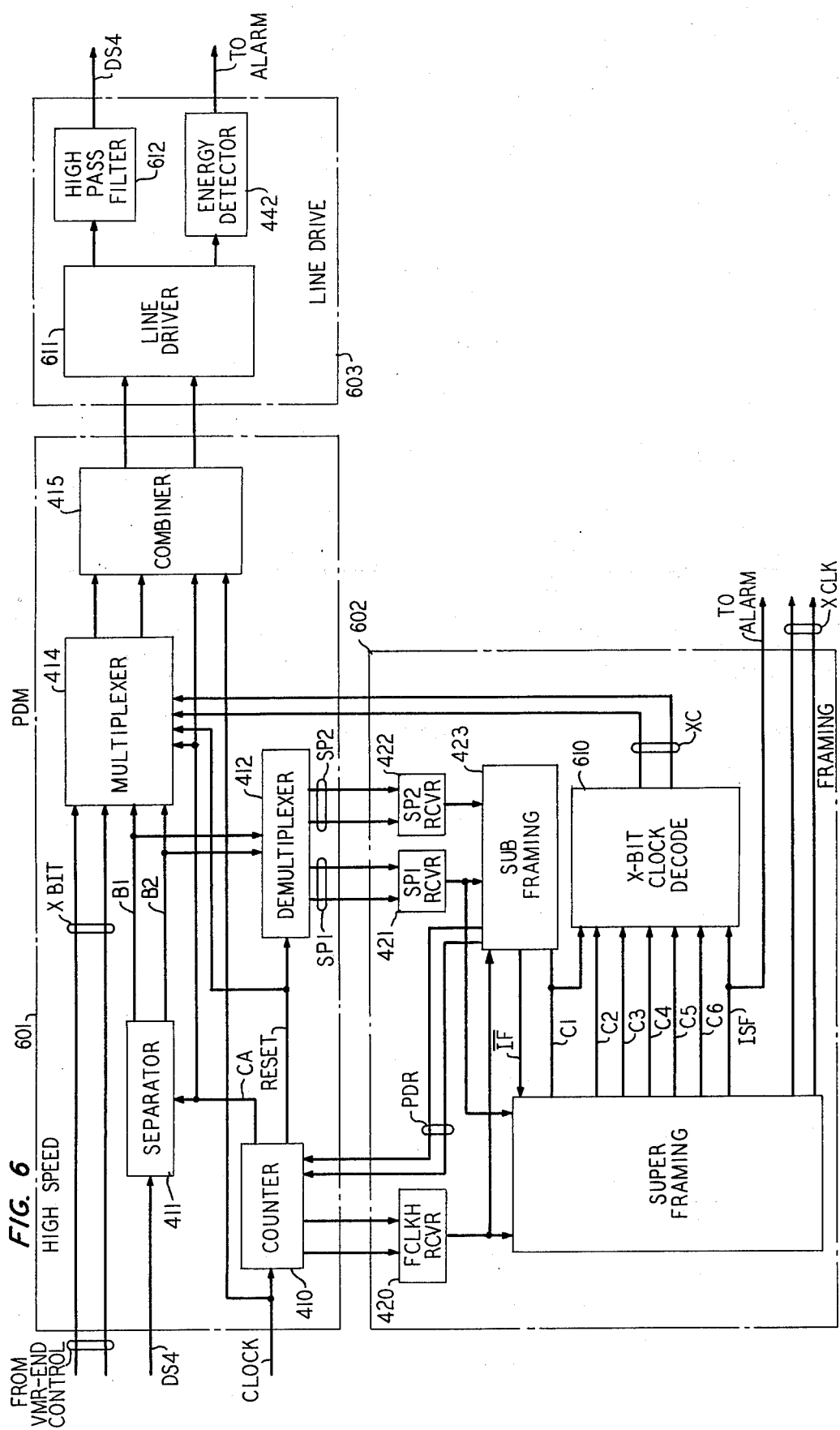
FIG. 6 shows details of the protection data multiplexer (PDM) employed in the system of FIG. 3.

During intervals that line P1 is not in use, the DS4 line drive signal from generator 230-1 is supplied via switch 231-1, one of switches 233-1, transmit regenerative repeater 236-1 and protection data multiplex (PDM) 237-1 to repeatered line P1 for transmission to intermediate receive office 102. PDM 237-1 is employed to insert protection switching logical signals in the X bit positions of the DS4 signal format for transmitting information downstream via protection lines P1 and P2 for purposes of effecting an upstream protection switch. PDM's in the upstream protection lines perform a similar function to effect a downstream protection switch. Details of PDM 237-1 are shown in FIG. 6 to be discussed below.

The output from PDM 237-1 is a DS4 signal which is supplied via protection line P1 to receive regenerative repeater 240-1 located in receive terminal 102. Repeater 240-1 yields a data signal and a clock signal which are supplied to protection violations monitor and remover (PVMR) 241-1. PVMR 241-1 performs all the functions of a VMR and, additionally, extracts protection switching information from the DS4 signal, namely, the X-bits and X-bit clock signals which are supplied to head-end protection switching control circuit of the upstream protection line (not shown), and detects whether the DS4 line drive signal is being transmitted via line P1. PVMR 241-1 supplies signals to VMR-end switching control 242-1 indicative of the presence or absence of the DS4 line drive signal, i.e., whether the L-bits are present or absent and also supplies signals indicative of a protection switch request. The DS4 line drive signal is employed to determine if the protection line is available for use and also to indicate that a head-end switch has been made, to be explained below. Thus, PVMR 241-1 initially detects whether or not the L-bits are present in the received DS4 signal, i.e., both logical 0. If not, the signal is not a DS4 line drive signal and the protection line is deemed busy. In such event, line P1 is not available for the requested protection switch. Once a protection switch request has been made and the protection line is available, detection that the L-bits are absent indicates a head-end switch has been made.

VMR-end switching control 242-1 is employed to determine if protection line P1 is available, to generate protection switch messages and to effect a tail-end switch of the protection line to the DROP terminal of a requesting service line. Since VMR-end switching control 242-1 is located in an intermediate office, it is also equipped, in accordance with an aspect of this invention, to receive demodulated protection switching messages via lines 250 from head-end switching control 235-2 which have been transmitted from downstream offices to be further discussed below.

A protection switching message is generated by a VMR-end switching control unit at the tail-end of a service line requesting a protection switch. It includes 9-bits. The first bit is always a logical 1 or a so-called prefix bit which obviates the need for framing or synchronization of the individual protection lines in a system employing cascading protection switching lines. The next 6-bits are the service line identification or address bits. The 8th-bit is a messabe bit, which is a logical 0, if the service line is requesting a new switch to be set up and the protection line is available or if a switch is already set up and a service line is repeating the switch request. The message bit, i.e., 8th-bit is a logical 1 if a service line is requesting a switch to be set up and the protection line is not available. The 9th-bit is a parity bit and is a logical 1 or 0 to realize even parity. The 9-bit message signal is generated by VMR-end switching control 242-1 and is supplied to upstream PDM 237-1A to be multiplexed and inserted into the X-bit positions of the upstream DS4 signal to be transmitted via upstream protection line P1A and extracted via upstream PVMR 241-1A which, in turn, supplies the X-bits and XCLK signals to head-end switching control 235-1. Thus, if downstream protection line P1 is available, i.e., the 8th message bit is a logical 0, head-end switching control 235-1 will, upon receiving a second affirmative switching request within a prescribed time interval, effect a head-end switch.

On the other hand, if the protection line is not available, VMR-end control 242-1 examines the switch request message to determine if the message bit is a 1 or 0. If the message bit is a 0, the instant VMR-end control modifies it, i.e., changes the 8th-bit to a 1 prior to supplying the 9-bit switch request message signal to PDM 237-1A for reinsertion into the X-bit positions of the DS4 signal for transmission to the next upstream office.

A protection switch is effected by signals from head-end control 235-1 which cause the bridge leg of the input hybrid of the requesting line, for example, hybrid 210 of line 110, to be connected via an appropriate one of transmission switches 233-1 to the input of transmit regenerative repeater 236-1 and, hence, to protection line P1. Transmission switches 233-1 also causes the output of switch 231-1 to be terminated properly and to be disconnected from switches 233-1 in well-known fashion. Consequently, the DS4 line drive signal from generator 230-1 is removed from protection line P1 and, therefore, the pseudorandom line drive signal including the L-bits is removed. This removal of the DS4 line drive signal is detected in receive office 102 by PVMR 241-1. In turn, PVMR 241-1 supplies a signal to VMR-end switching control 242-1 indicating that the line drive signal is absent and that a head-end switch has been made. Additionally, PVMR 241-1 evaluates the incoming service signal for parity, framing and energy level to determine if it is a good signal. During this time, VMR-end switch control 242-1 waits for a prescribed interval. If at the end of the waiting interval PVMR-1 does not request a switch, the service signal being transmitted via protection line P1 is deemed good. In such event, VMR-end switching control 242-1 effects a corresponding VMR-end switch via receive switch 215 and switch 243-1, thereby connecting the tail-end of protection line P1 to DROP terminal 216. On the other hand, at the end of this waiting interval if PVMR 241-1 generates a signal requesting a switch, VMR-end switch control 242-1 generates a signal indicating a so-called upstream failure. This indicates that the switched service signal being transmitted via protection line P1 is not good, i.e., that the signal being supplied to hybrid 210 is bad and, consequently, is an upstream failure. In such event, substitution of the protection line is not completed and a DS4 line drive signal is supplied via the VMR of the faulted line. This DS4 line drive signal eliminates the possibility of several downstream lines indicating a fault and allows for sectionalization of the fault to a particular maintenance span.

Let us now consider the operation of this embodiment of the instant invention for providing protection service for line 121 directly coupling a head-end transmit terminal, for example, terminal 101 to a remote tail-end receive terminal, for example, terminal 104. In order to effect a substitution of a protection line for service line 121 it is necessary, in accordance with this embodiment of the invention, to substitute a series connection of both protection lines P1 and P2. As indicated above, protection line P2 includes essentially identical equipment as protection line P1, these equipments have been designated —2. Additionally, VMR-end switching control 242-1, employed at the receive terminal of protection line P1, is linked directly via lines 250 to head-end switching control 235-2 of protection line P2. Linking of VMR-end switching control 242-1 and head-end switching control 235-2, which are both located in the same intermediate add-drop office, facilitates transmission of protection switching messages, i.e., X-bit information, directly across the intermediate add-drop office and, thereby, unburdens the communications lines and also saves equipment. Additionally, during intervals in which there are no request or request for a protection switch, certain test signals are transmitted from the VMR-end control in the tail-end receive office to exercise the protection lines. Each VMR-end switching control has the capability to generate the test signals. However, interconnection of the head-end switching control unit and the VMR-end switching control unit in each intermediate add-drop office enables, in accordance with an aspect of the invention, cross office transmission of the test signals as well as switch request signals. Consequently, test signals from the last downstream office not having a protection line in use need only be transmitted upstream. In such event, the test signal generators of the individual VMR-end control units are disabled and the system again is not overburdened with multiple transmissions of test signals.

Let us now consider operation of this embodiment of the invention for substitution of a plurality of protection lines for a faulted service line. Assuming that the service signal being transmitted via service line 121 is bad, VMR 205 in receive terminal 104 generates a switch request signal which is supplied to VMR-end switching control 242-2. PVMR 241-2 determines whether protection line P2 is available. Again, this is achieved by examining the DS4 signal being received from protection line P2 for L-bit information to determine whether it is the DS4 line drive signal. If protection line P2 is not available, i.e., L-bits are absent, VMR-end switching control 242-2 supplies an appropriate indication to an alarm circuit. VMR-end control 242-2 continues to scan the VMR outputs for switch requests and once line P2 is available it would honor the switch request from VMR 205. In addition, a switch request message is transmitted to head-end switching control 235-1 via PDM 237-2A and protection lines P2A and P1A. The switch message includes information that an on-going failure has occurred in terminal 101 and is useful for locating the faulty equipment.

If on the other hand, protection line P2 is available, VMR-end switching control 242-2 generates a switch request message which is inserted via PDM 237-2A into the X-bit positions of the DS4 signal being transmitted upstream via protection line P2A. The switch message, i.e., X-bit information, is extracted by PVMR 241-2A and supplied to head-end switching control 235-2. Control unit 235-2 first examines the identification bits of the switch message to determine whether or not the head-end of service line 121 is located in terminal 103. If so, upon reception of a second switch request message within a prescribed interval, a head-end switch is effected and protection line P2 is substituted for the requested service line. However, in this example, the head-end of service line 121 is not located at terminal 103. Head-end switch control 235-2, therefore, will not find a match between the identification bits of the protection switch message and the identification bits of the service lines originating in terminal 103. In such event, head-end switching control 235-2 supplies the switch request message, i.e., X-bits, across office via lines 250 to MVR-end switching control 242-1 of protection line P1. In turn, VMR-end switching control 242-1 examines the switch request message and also determines if protection line P1 is available. If line P1 is not available VMR-end control 242-1 modifies, in accordance with one aspect of the invention, the message by changing the 8th-bit from a logical 0 to a logical 1 to indicate that protection line P1 is not available for a switch. The modified switch message is then reinserted via PDM 237-1A into the upstream DS4 signal for transmission to subsequent upstream offices. If on the other hand, protection line P1 is available, the message bit remains a logical 0 and the message, i.e., X-bit information, is inserted via PDM 237-1A into the upstream DS4 signal being transmitted via protection line P1A to PVMR 241-1A. Again PVMR 241-1A will extract the X-bits and supply them and, hence, the protection switching message to head-end switching control 235-1. Head-end switching control 235-1 compares the identification bits and finds a match which indicates that the head-end of service line 121 is located at terminal 101. Upon receiving a second switch request within the prescribed interval unit 235-1 generates signals causing the bridging leg of hybrid 202 to be connected via one of transmission switches 233-1 to protection line P1. Thus, the service signal being supplied via terminal 201 of line 121 is supplied via protection line P1 to protection line P2. If either of protection lines P1 or P2 was busy, the message bit would have been a logical 1 and, in such event, head-end control 235-1 would not have effected a switch and claims indicating the busy condition would have been enabled. This examination and modification of the switch request message is the basis for a nonhierarchical approach to protection switching. Since each service line is given a unique address and each switch message is examined at each office in the protection switching system, new lines between any of the offices and even new offices may be added with a minimum of modification to the existing system. All that is required in existing offices is to equip the new service lines with so-called per-line logic arrangements to be discussed below. A new office may be added so long as the protection line to the new office is connected in series with the protection lines in the existing system.

As described above, the connection of a service signal to protection line P1 automatically causes DS4 signal generator 230-1 to be disconnected, thereby removing the DS4 line drive signal from protection line P1. Since all the downstream protection lines are connected in series the line drive signal from signal generator 230-1, assuming that none of the intermediate protection lines is substituted for a service line, is supplied to each subsequent downstream protection line. In this example, the receive end of protection line P1 is connected across office to the transmit end of the protection line P2 via hybrid 232-2. In turn, the service signal from terminal 201 is supplied via switch 231-2, to protection line P2. A signal for controlling switch 231-2 to effect this connection is generated by energy detector 234-2. Thus, the service signal from terminal 201 is supplied via protection line P2 to receive terminal 104. In receive terminal 104, PVMR 241:2 examines the incoming signal to determine whether the DS4 line-drive signal is present and also to determine whether the signal has certain attributes, namely, parity, framing and energy level. Since the incoming signal is a service signal, observations of the L-bit positions by PVMR 241-2 indicate absence of the line-drive signal. Consequently, PVMR 241-2 yields a line-drive signal absent indication which is supplied to VMR-end switching control 242-2. VMR-end switching control 242-2 waits a predetermined interval while PVMR 241-2 determines whether or not the incoming service signal is a good signal, i.e., has proper parity, framing and energy level. If not, appropriate alarms are activated indicating an upstream failure. That is to say, in the event the DS4 service signal being supplied to terminal 201 from an upstream maintenance span is not good. VMR-end switching control 242-2 does not complete the receive-end switch. Independent of the action of the protection switching system, VMR 205 inserts a DS4 line-drive signal from generator 230-2A at the tail-end of line 121. This insertion of the line-drive signal prevents the fault from being propagated into the next maintenance span. If the incoming service signal is good, VMR-end switching control 242-2 generates signals for controlling receive switches 243-2 and 206 to effect a tail-end switch and, in accordance with this embodiment of the invention, a substitution of protection lines P1 and P2 for service line 121.

VMR-end control 242-2 periodically transmits a switch request signal upstream at prescribed intervals. This is necessary to maintain a protection switch. If no switch request message is being transmitted a special test signal is transmitted at prescribed intervals to exercise the protection lines.

Release of the protection switch at the VMR-end of line P2 occurs when a scanner in VMR-end switching control 242-2 no longer observes a switch request from VMR 205. VMR-end control 242-2 generates a control signal which causes receive switch 243-2 and receive switch 206 to remove the connection of protection line P2 from DROP terminal 207 and to reconnect line 121 to terminal 207, respectively.

Release of the head-end switch of line 121 to protection line P1 is realized by head-end control 235-1 simply observing that switch request messages are no longer being received. No release switch command signal is sent upstream and the switch is simply dropped. Once the head-end switch is released the protection lines are available to protect other service lines.

Violations Monitor and Remover

Figure 4A:
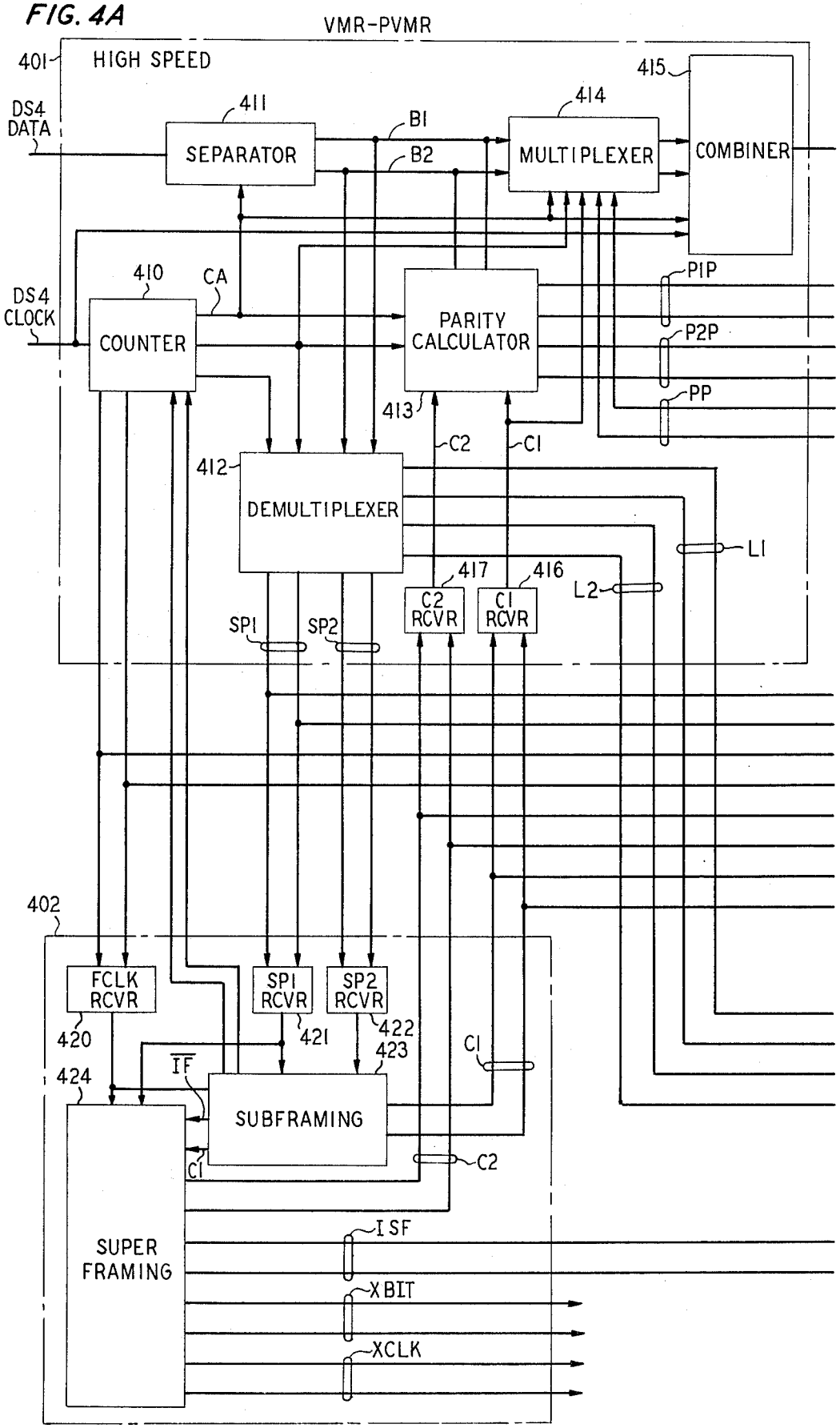

FIGS. 4A and 4B when combined as shown in FIG. 4, depict in block diagram form details of the violations monitor and removers (VMRs) and protection violations monitor and removes (PVMRs) utilized in the system illustrated in FIG. 3. To facilitate the description of the VMR and PVMR the circuit shown in FIG. 4 has been divided into several sections, namely, high-speed section 401, framing section 402, evaluation section 403 and line drive section 404.

VMR "high-speed" 401 performs all of the socalled high-speed functions of the VMR. High-speed functions are defined as those at frequencies greater than 2.8 megahertz. Broadly stated, the purposes of high-speed section 401 are to demultiplex the parity bits and L bits from an incoming data signal, to insert calculated parity bits into the data signal and to output the data signal. Additionally, it also effects backward acting reframing. To this end, high-speed section 401 includes counter 410, separator 411, demultiplexer 412, parity calculator 413, multiplexer 414 and combiner 415.

Figure 7:
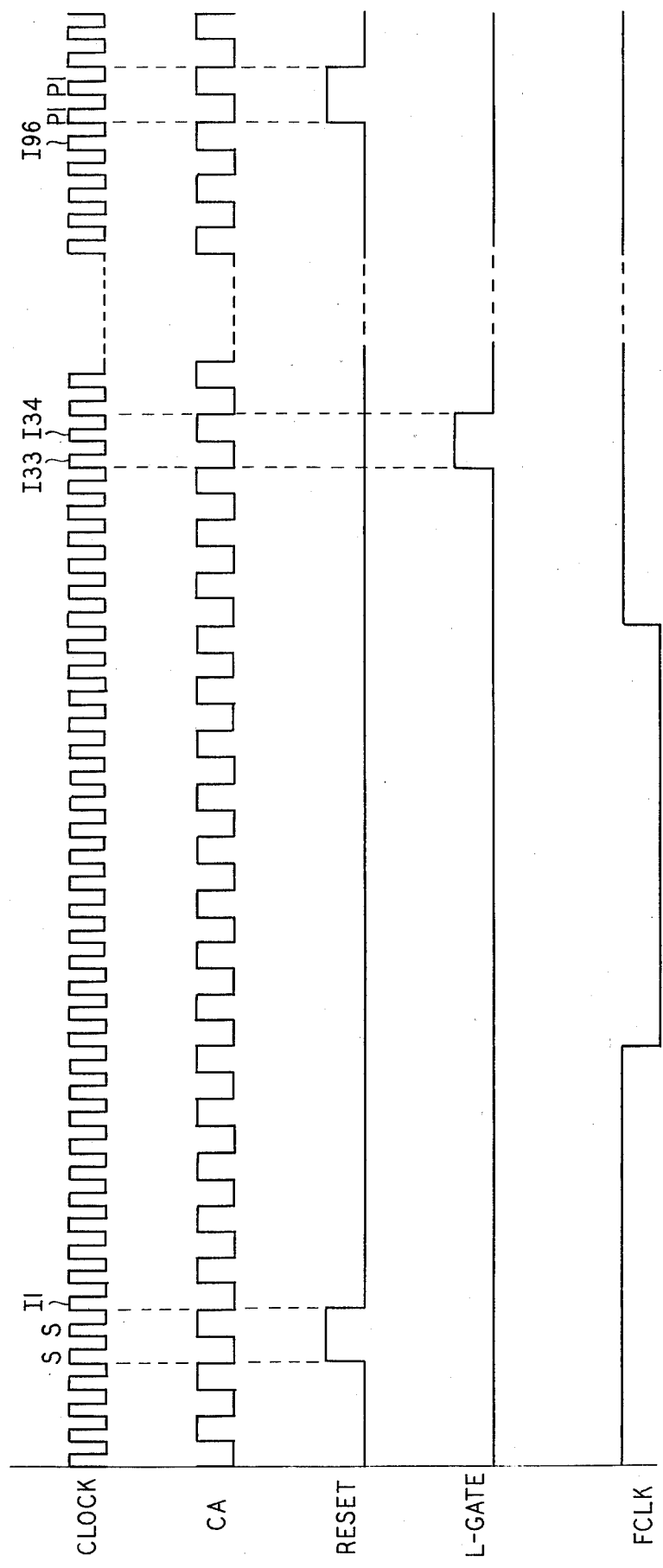
FIGS. 7 and 8 depict sequences of waveforms useful in describing the operation of both the violations monitor remover of FIG. 4 and the protection data multiplexer of FIG. 6.

The incoming clock signal derived from a receiving regenerative repeater is supplied to counter 410 and to combiner 415. The incoming clock signal is at the T4M frequency of approximately 274 megahertz. Counter 410 is a digital divider which is employed in well-known fashion to obtain a plurality of timing signals used in various system functions. In this example, counter 410 is a divide-by-98 arrangement. This division is achieved by employing a divide-by-2 circuit and a divide-by-49 circuit. Accordingly, counter 410 yields clock signals CA, RESET, L-gate, and FCLK as shown in FIG. 7. CA is a clock signal at one-half the transmission rate, i.e., approximately 137 megahertz, which is supplied to separator 411, parity calculator 413, multiplexer 414 and combiner 415. RESET is a pulse signal obtained by dividing the 274 megahertz clock by 98, i.e., an approximately 2.8 megahertz signal having a phase so that it occurs during the framing bits of each subframe (see FIG. 2). The RESET clock pulse is employed to initialize the system for framing purposes, to initialize parity calculator 413 for purposes of parity calculations and to initialize multiplexer 414 for purposes of inserting calculated parity bits in streams B1 and B2. L-gate is a pulse signal which is also generated by dividing the incoming clock signal by 98. The phase of the L-gate pulse is set so that it occurs during data bits I33 and I34, i.e., the L bits (see FIG. 2). The L-gate signal is supplied to demultiplexer 412. FCLK is a clock signal which is generated by dividing the incoming data signal by 98. It is an approximately 2.8 megahertz clock signal having a 58 nanosecond pulse width. Thus, one FCLK pulse is generated during each subframe. The phase relationship of the FCLK pulse within each subframe of the incoming data signal is not particularly critical so long as the FCLK pulse does not occur concurrently with or near the framing and parity bits, i.e., S $\overline{S}$, P1P1 or P2P2. Balanced FCLK signals are supplied to FCLK receiver 420 in framing section 402 and to FCLK receiver 431 in evaluation section 403.

Timing signals clock, CA, RESET, L-gate and FCLK generated in high-speed section 401 are illustrated in FIG. 7.

Separator 411 is simply a serial-to-parallel converter which is employed to divide the incoming data signal into bit streams B1 and B2. Bit streams B1 and B2 are both at one-half the T4M bit rate, i.e., approximately 137 megabits per second. When the VMR is in frame, bit stream B1 contains ODD bits including both parity and data bits, i.e., S, I1, I3, etc., and bit stream B2 contains EVEN bits also including both parity and data bits, i.e., $\overline{S}$, I2, I4, etc. Bit stream B1 and B2 are supplied to demultiplexer 412, parity calculator 413 and multiplexer 414. The desired separation of the incoming bit stream into ODD and EVEN bit streams B1 and B2 is obtained in well-known fashion as will be apparent to those skilled in the art by employing flip-flops (not shown) which are clocked at half the incoming rate by clock signal CA.

Demultiplexer 412 is employed to demultiplex bit streams B1 and B2 to obtain ODD and EVEN framing and parity bits SP1 and SP2, respectively, and to obtain two L bits, i.e., L1 and L2 which are data bits I33 and I34, respectively. ODD framing bits include S, first P1, S, first P2, etc., while EVEN framing bits include $\overline{S}$, second P1, $\overline{S}$, second P2, etc., (see FIG. 2). The demultiplex functions are achieved in well-known fashion apparent to those skilled in the art only when the VMR circuit is in-frame by employing the RESET clock signal to clock two D-type flip-flops (not shown) to which bit streams B1 and B2 are supplied and by employing the L-gate clock signal to clock two other D-type flip-flops (not shown), to which bit streams B1 and B2 are also supplied. The demultiplexed framing bits SP1 and SP2 are supplied as balance signals to SP1 receiver 421 and to SP2 receiver 422, respectively, in framing section 402. Balanced SP1 framing bits are also supplied to SP1 receiver 431 in evaluation section 403. Similarly, the demultiplexed L bits, namely, L1 and L2 are supplied to line drive detector 431 in evaluation section 403. Line drive detector 432 is employed only for PVMR applications. When the VMR or PVMR is out of frame, demultiplexer 412 continues to generate SP1 and SP2 signal for framing section 402 to evaluate in order to generate PDR signals which are supplied to counter 410 for purposes of reframing.

Parity calculator 413 generates parity bits calculated from the presently received frame of ODD and EVEN bit streams B1 and B2, respectively. Calculator 413 functions to yield calculated parity bits P1P and P2P only when the VMR circuit is in frame. When the VMR circuit is out of frame, outputs P1P and P2P are "nonsense" bits, i.e., have no relationship to parity. Timing signals RESET from counter 410, and C1 and C2 from framing section 402 are employed to calculate parity of bit streams B1 and B2. C1 is a clock signal generated in subframing unit 423 at the subframe rate of 274 megabits divided by 196 (see FIG. 2) or an approximately 1.4 megahertz square wave. C2 is a clock signal generated in superframing unit 424 at the parity frame rate of 274 megahertz divided by 392 or an approximately 0.7 megahertz square wave. Balanced C1 and C2 clock signals from framing section 402 are converted in well-known fashion into single ended signals via C1 receiver 416 and C2 receiver 417, respectively. Thereafter, the C1 clock signal is supplied to parity calculator 413 and to demultiplexer 414. Similarly, the C2 clock signal is supplied to parity calculator 413. The C1, C2 and RESET clock signals are employed in a manner which will be apparent to those skilled in the art to define the presently received parity frame. For example, a RESET pulse corresponding to the instant that both C1 and C2 are concurrently in a low state defines the beginning of a parity frame. This specific RESET pulse is employed as a parity clock signal. In turn, the parity clock signal is employed to pass only those CA clock pulses which correspond to data bits of the B1 and B2 bit streams. Data bits in each of bit streams B1 and B2 are observed by employing flip-flops (not shown) in a fashion apparent to those skilled in the art to determine whether the number of logical 1s in each of bit streams B1 and B2 is ODD or EVEN. ODD or EVEN parity is indicated by the outputs of the flip-flops associated with the B1 and B2 bit streams. If the output of a flip-flop associated with bit stream B1 is a logical 1, parity is ODD, if a logical 0, parity is EVEN. The same is true for bit stream B2. At the end of the parity frame the parity clock pulse resets the parity flip-flops.

The calculated parity of ODD and EVEN bit streams B1 and B2, respectively, are the flip-flop outputs at the end of the parity frame and are designated P1P and P2P, respectively. In turn, calculated parity bits P1P and P2P are supplied to violations detector 433 where they are compared with the received parity bits SP1 and SP2, respectively. Thereafter, the calculated parity bits properly delayed and designated PP are supplied to multiplexer 414 to be inserted into bit streams B1 and B2. The calculated parity bits must be delayed because they are calculated from the data bits in the presently received parity frame. As explained above in relation to the DS4 signal format shown in FIG. 2, parity bits P1P1 and P2P2 contain the parity information of the preceding parity frame. Consequently, parity bits PP calculated from the presently received frame must be inserted in the appropriate bits of the next subsequent received parity frame and, hence, the need for delaying them.

Multiplexer 414 is employed to insert calculated parity bits PP into ODD and EVEN bit streams B1 and B2. This insures the parity integrity of the data signal by updating the parity information being transmitted downstream. To this end, a plurality of logic gates associated with two output flip-flops (not shown) are employed to insert calculated parity bits PP into bit stream B1 and B2. Clock signals C1 and RESET are used to control the gates for allowing the received data bits in bit streams B1 and B2 to pass to associated flip-flops while inhibiting the received parity bits. Similarly, the gates are arranged to pass calculated parity bits PP during the intervals that the incoming parity bits are inhibited. Thus, calculated parity bits containing ODD and EVEN parity information for the preceding parity frame are inserted into the P1P1 and P2P2 positions of the presently received frame (see FIG. 2). Revised bit streams B1 and B2 are thereafter supplied to combiner 415.

Combiner 415 is simply a parallel-to-serial converter which is employed to recombine bit streams B1 and B2 into a DS4 data signal. In turn, the revised DS4 data signal is supplied to line drive section 404.

Figure 8:
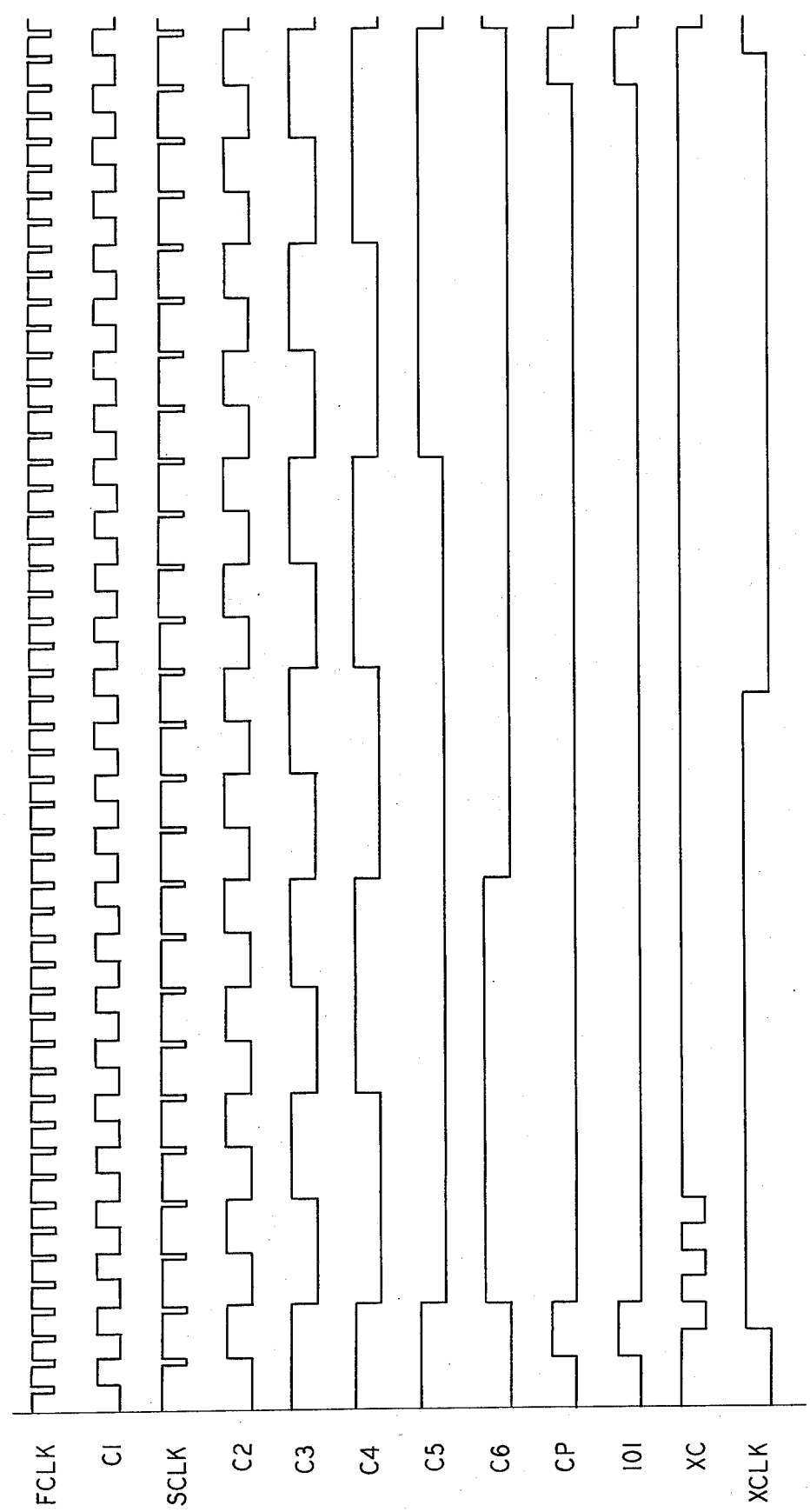

Framing section 402 shown in FIG. 4 is employed to find the DS4 signal frame format and then to lock counter 410 of high-speed section 401 to the frame location of the incoming DS4 signal. Framing section 402 is divided into two parts, namely, subframing unit 423 and superframing unit 424. Timing signals utilized and generated in framing section 402, namely, FCLK, Cl, SCLK, C2, C3 through C6, CP 101 and XCLK are shown in FIG. 8. Cl is generated in subframing unit 423 by dividing FCLK by 2. SCLK is generated in superframing unit 424 by passing FCLK and Cl through an OR gate. C2 through C6, CP and XCLK are generated by decoding phases of the divide-by-24 superframe counter.

Subframing unit 423 detects whether or not the VMR or PVMR is in-subframe. This is achieved by observing the S and P bits in SP1 and SP2 to determine if the S bits in SP1 are the inverse of the S bits in SP2 and to determine if the P bits in SP1 are the same as the P bits in SP2. Each such determination is considered a single good check, otherwise it is considered a bad check, i.e., either S equals the inverse of S or P equals P is a good check. When the VMR circuit is out-of-subframe, each bad check causes a pulse delete request (PDR) pulse to be sent to counter 410. Counter 410 responds to each PDR pulse to gate out one pulse of the incoming DS4 clock signal. This gating out of a DS4 pulse causes the phase of counter 410 to slip one bit position relative to the incoming clock signal. Consequently, the SP1 and SP2 framing signals from mutliplexer 412 are now located at a new position. This slipping of counter 410 is repeated each subframe until an in-subframe condition is detected.

Figure 5:
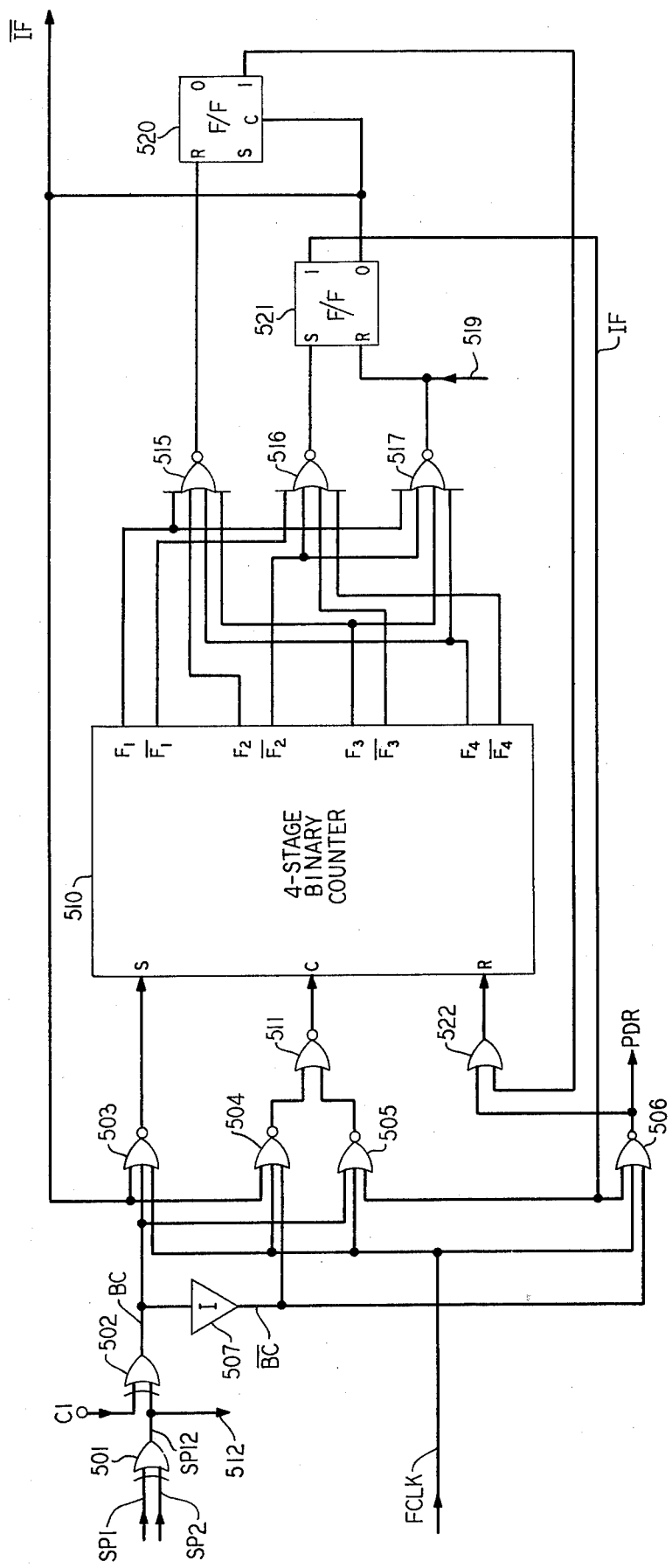
FIG. 5 shows details of a counter employed in the violations monitor and remover of FIG. 4.

An in-subframe condition is defined as having observed 15 consecutive good checks of S and P bits in SP1 and SP2. This is effected by employing a counter to count the number of consecutive good comparisons of the S and P bits when the circuit is out of frame. Once the circuit is in-subframe, subframing unit 423 continues to make checks of the S and P bits for bad checks. Three consecutive bad checks causes the subframing unit 423 to go out-of-subframe. The number of consecutive bad checks is observed by employing a counter which is enabled only when subframing unit 423 is insubframe and is reset to an initial condition whenever a good check is observed. A circuit for realizing both the good check count and the bad check count is shown in FIG. 5 to be described below. Additionally, subframing unit 423 examines the check sequence for strings of alternating good and bad checks. A string of eight alternate good and bad checks causes the circuit to go out-of-subframe. That is, subframing unit 423 will go out-of-subframe if the incoming data bits are all logical ls or all logical 0s, indicating some form of catastrophic failure. Here again, a three stage binary counter and associated logic gates (not shown) may be employed to observe strings of alternating good and bad checks. The logic simply compares the present state of SP12 with the previous state of SP12 to observe changes in SP12. The counter simply resets when two successive good or bad checks are observed. Thus, once the VMR circuit is in-subframe, an out-of-frame condition can be caused by observing a string of three consecutive bad checks or a string of eight alternating good and bad checks.

Subframing unit 423 supplies signal $\overline{IF}$ and clock signal C1 for purposes of controlling superframing unit 424. Specifically, when subframing unit 423 is out-of-subframe signal $\overline{IF}$ inhibits operation of superframing unit 424. When in-subframe, $\overline{IF}$ enables superframing unit 424 to become operative for locating the superframe of the incoming DS4 signal. To this end, superframing unit 424 has three modes of operation, namely, search, check and in-superframe. The particular mode of operation that superframing unit 424 is currently in is indicated by one of three status flip-flops (not shown) in well-known fashion. Initially, unit 424 is in a search mode and searches for marker bits M1 M2 M3 = 101 in incoming bits SP1. As described above, the marker bits are M1 M2 M3 of an S word, i.e., the S bits of SP1. Since every other bit of SP1 is an S bit, superframe unit 424 observes every other bit of SP1 for the desired marker pattern. This is realized by employing a three stage shift register and NOR gate. The S bits are then advanced by SCLK pulses. SCLK is obtained by passing Cl and FCLK through an OR gate to obtain pulses corresponding to the S bits in SP1. When the marker bits are present, i.e., 101, in the shift register the NOR gate output is a logical 1.

Superframing unit 424 includes a divide-by-48 arrangement, made up of divide-by-2 and divide-by-24 counters, which is initially free running relative to the superframe timing. The divide-by-24 counter is designated the superframe counter and is employed to divide SCLK signals in order to generate superframing clock signals. The division of 24 is necessary because each superframe includes 24 subframes and SCLK is at the subframe rate. This counter also yields the C2 clock signals which is SCLK divided-by-2.

Once a first 101 marker group is detected, the divide-by-24 counter is set to a predetermined state to synchronize it with the superframe timing of the incoming DS4 signal. Then, on the next clock pulse superframing unit 424 goes into a check mode. If a second consecutive 101 marker group is observed in synchronism with the divide-by-24 counter, superframing unit 424 goes into the in-superframe mode. This is indicated by an in-superframe status flip-flop changing state which, in turn, yields in-superframe signal ISF. Balanced ISF signals are supplied to ISF receiver 434 in evaluation section 403. If a second consecutive 101 marker group is not detected, superframing unit 424 reverts back to the search mode and the search process is iterated unitl two consecutive 101 marker groups are observed.

One in-superframe, superframing unit 424 continually observes the marker group pattern. A digital counter (not shown) is employed in a manner which will be apparent to those skilled in the art to observe whether or not four consecutive marker groups are missing. If four consecutive marker groups are absent, or if subframing unit 423 goes out of subframe as indicated by $\overline{IF}$, a signal is generated to reinitialize superframing unit 424 to the search mode. Thereafter, the superframing process is iterated until again in superframe.

When unit 424 is in superframe, X bits are extracted from SP1 for protection switching purposes (PVMR applications only). Thus, once superframe is obtained X bits are extracted from SP1. X1 X2 X3 are the bits immediately after the marker bits M1 M2 M3 = 101 (FIG. 2). Since X1 X2 X3 are either 111 or 000 a well-known majority logic arrangement (not shown) is employed to detect the X bit groups. When in superframe and the superframe counter is at a first predetermined state the shift register contains the X bits. The majority logic makes a two-out-of-three decision and yields a logical 1 only when two-out-of-three of the X bit signals are logical 1s. The logic output is supplied to a J-K flip-flop which is clocked only during X bit intervals, i.e., three times while superframe counter is at the first predetermined state. The flip-flop yields three logical 1s if the logic output is a logical 1, otherwise it yields three logical 0s. Both the X bits and the X bit clock signals are supplied to a corresponding head-end switching control unit for protection switching purposes.

Referring now to FIG. 5, there is shown details of a counter arrangement used to count both good and bad checks in subframing unit 423 of FIG. 4. Accordingly, single ended SP1 and SP2 framing bits are supplied to inputs of Exclusive OR gates 501. Gate 501 operates in well-known fashion to "combine" SP1 and SP2 and yield SP12. That is to say, output SP12 is a logical 0 when SP1 and SP2 are both either logical 0s or logical 1s, and output SP12 is a logical 1 when SP1 is the inverse of SP2. Consequently, SP12 is a logical 0 when SP1 = SP2 and a logical 1 when SP1 = $\overline{SP2}$. SP12 is supplied to one input of exclusive OR gate 502 and to the alternating good/bad check counter (not shown).

Subframe clock signal C1 (1.4 megahertz square wave) is supplied to a second input of gate 502. Gate 502 combines C1 and SP12 to yield bad check signal BC. Thus, when C1 is low, BC is low or a logical 0 if SP1 = SP2 and when C1 is high, BC is low, i.e., a logical 0 if SP1 = $\overline{SP2}$. Therefore, C1 defines the positions of S and P bits. When FCLK is low, BC is also low if the check on the S or P bits is good. FCLK (a 58 nanosecond pulse at 2.8 megahertz) is supplied to a first input of NOR gates 503, 504, 505 and 506. BC is supplied to inverter 507 and to second inputs of gates 503 and 505. Inverter 507 yields $\overline{BC}$ which, in turn, is supplied to second inputs of gates 504 and 506. $\overline{BC}$ is high, i.e., a logical 1 when a good check is obtained. The output of gate 503 is supplied to the set (s) input of all stages of four stage binary counter 510. Outputs from gates 504 and 505 are supplied to inputs of NOR gate 511. In turn, the output of gate 511 is supplied to the clock (C) input of the first stage of counter 510.

As described above, subframing unit 423 (FIG. 4) is in-subframe after 15 consecutive good checks have been observed and goes out of subframe after 3 consecutive bad checks have been observed. NOR gates 515, 516 and 517 are employed to decode the outputs of counter 510 for generating control signals employed to indicate these conditions. Gate 515 yields a logical 1 when $F_1 = F_2 = F_3 = F_4 = 0$, i.e., when counter 510 overflows to its initial state of 1. Gate 516 yields a logical 1 when $\overline{F_1} = \overline{F_2} = \overline{F_3} = \overline{F_4} = 0$, i.e., at a count of 15. Gate 517 yields a logical 1 when $F_1 = \overline{F_2} = F_3 = F_4 = 0$, i.e., at a count of 3. The output from gate 515 is supplied to the reset (R) input of flip-flop 520. Similarly, the outputs from gates 516 and 517 are supplied to the set (S) and reset (R) inputs, respectively, of flip-flop 521. When output 1, IF, of flip-flop 521 is a logical 1, 15 consecutive good checks have been observed and subframing unit 423 is in-subframe. Output 1 of flip-flop 521 is supplied to third inputs of gates 505 and 506. Thus, gates 505 and 506 are disabled when IF = 1 and enabled when IF = 0. When output 0, $\overline{IF}$, of flip-flop 521 is a logic 1, 3 consecutive bad checks or 8 alternating good-bad checks have been observed and subframing unit 423 is out-of-subframe. Output 0 of flip-flop 521 is supplied to the clock (C) input of flip-flop 520 and to third inputs of gates 503 and 504. Thus, gates 503 and 504 are disabled when $\overline{IF}$ = 1 and enabled when $\overline{IF}$ = 0. Output 1 of flip-flop 520 is supplied to a first input of OR gate 522. Similarly, the output of gate 506 is supplied to a second input of gate 522. In turn, the output of gate 522 is supplied to the reset (R) inputs of the stages of counter 510.

The counter arrangement of FIG. 5 operates when subframing unit 423 (FIG. 4) is out-of-subframe to count good checks and when in-subframe to count bad checks. When an out-of-subframe condition exists $\overline{IF}$ = 0 and IF = 1. Consequently, gates 503 and 504 are disabled, and gates 505, 506 and 511 are enabled. This conditions the counter for counting good checks. Then, each bad check, i.e., BC = 1 or $\overline{BC}$ = 0 causes an FCLK pulse to pass through gate 506 yielding a pulse delete request (PDR) signal. The PDR signal is supplied to counter 410 (FIG. 4) for framing purposes and also via gate 522 to reset counter 510 to state 1. Each good check. i.e., BC = $\overline{BC}$ = 1, causes an FCLK pulse to pass through gates 505 and 511 to advance counter 510 by one count. Fifteen consecutive good checks causes counter 510 to yield $F_1 = F_2 = F_3 = F_4 = 1$ causing gate 516 to yield a logical 1. In turn, flip-flop 521 is set and IF = 1 and $\overline{IF}$ = 0 indicating an in-subframe condition. This in-subframe condition of IF = 1 and $\overline{IF}$ = 0 causes gates 505 and 506 to be disabled and gates 503 and 504 to be enabled. Thus, inhibiting good check counts and enabling bad check counts. Each good check, i.e., BC = 0, $\overline{BC}$ = 1 causes an FCLK pulse to pass via gate 503 to the set (S) inputs of counter 510 thereby setting counter 510 to state 16. Each bad check, i.e., BC = 1, $\overline{BC}$ = 0 causes an FCLK pulse to pass via gates 504 and 511 to advance counter 510 by one count. The first bad check causes counter 510 to pass from state 16 to state 1. Three consecutive bad checks causes counter 510 to be in state 3, i.e., $F_1 = F_2 = F_3 = F_4 = 0$. Consequently, gate 517 yields a logical 1 which resets flip-flop 521 causing IF = 0 and $\overline{IF}$ = 0, thereby indicating an out-of-subframe condition. Additionally, flip-flop 520 is toggled causing a logical 1 to appear at its 1 output. In turn, this logical 1 is supplied via gate 522 to reset counter 510 to state 1. Thereafter, counter 510 is conditioned to count good checks. The above process is repeated until an in-subframe condition is indicated.

Returning now to FIG. 4, evaluation section 403 includes violation detector 433, performance evaluation 434 and line drive detector 432. Line drive detector 432 is utilized only for PVMR applications.

Violation detector 433 is employed to compare calculated parity bits P1P and P2P from parity calculator with the received parity bits in SP1. This is achieved by employing logic gates, in a manner which will be apparent to those skilled in the art, which are clocked by FCLK, C1 and C2 timing signals. When the calculated and received parity bits do not compare error signal PEP is generated and supplied to performance evaluator 435. Additionally, violation detector 433 alternately supplies calculated parity bits P1P and P2P via PP to multiplexer 414 to be inserted into the P1 and P2 bit slots of bit streams B1 and B2.

Line drive detector 432 is employed only in PVMR applications and is operative only when the PVMR is in superframe to detect the presence of L-bits in the DS4 signal. A four-stage binary counter arrangement substantially identical to that shown in FIG. 5 is employed to observe the L-bits from demultiplexer 412. When the incoming DS4 signal is a line drive signal, L1 and L2 are both logical 0s. Input logic to the counter yields signals indicating either a good or bad check of the L-bits. A good check is defined as L1 = L2 = 0 for two periods of FCLK (one period of C1). Thus, four consecutive logical 0s in the L bits constitutes a single good check. If four consecutive logical 0s are observed, a good check signal is generated otherwise a bad check signal is generated. A pair of flip-flop circuits and a logic gate (not shown) may be employed in a manner apparent to those skilled in the art to generate the desired L-bit good check and bad check signals. These L-bit good check and bad check signals are supplied in place of BC and $\overline{BC}$ to a counter substantially identical to that shown in FIG. 5. The counter output logic is arranged to yield a line drive present, LDP = 1 signal when fifteen consecutive L-bit good checks are observed and a line drive absent, LDP = 0 signal when five consecutive bad checks are observed. The line drive present or absent LDP signals are supplied to an associated VMR-end switching control unit.

Performance evaluator 435 is employed to examine parity error pulses PEP, superframe indication ISF and energy detection indication SA for determining: when to request a protection switch and enable a corresponding alarm; when to release a protection switch request and corresponding alarm; when to replace the incoming DS4 signal with a DS4 line drive signal; and when to switch from the line drive signal to the incoming DS4 signal.

These operational procedures are implemented by evaluator 435. Specifically, a switch request is made if parity error pulse (PEP) rate is greater than $10^{-6}$, i.e., greater than a prescribed number of PEPs in a predetermined interval, for example, greater than 31 PEPs in 100 milliseconds; or ISF indicates an out-of-frame condition; or if SA indicates no output energy. A switch request release is effected if the parity error rate is less than $10_+^{-7}$, and ISF indicates an in-frame condition and SA indicates presence of output energy. A DS4 line drive signal insertion control signal is generated if ISF indicates an out-of-frame condition and after a prescribed interval the ISF signal still indicates that the out-of-frame condition subsists. The DS4 line drive insertion signal is discontinued if ISF indicates an in-frame condition and no switch request is indicated.

The bit error rate of the incoming DS4 signal is determined by observing the occurrence of parity error pulses PEP from violation detector 433. This is achieved by employing a plurality of timer circuits and a counter (not shown). A first timer having a prescribed timing interval, for example, 100 milliseconds is enabled by the first detected parity error pulse PEP. The PEP pulse also advances a count-to-32 counter (five stage binary) by one count. A 32 count is employed because the error rate is defined to be $10^{-6}$ which corresponds to greater than 31 errors in a 100 millisecond interval. If within this first 100 millisecond interval the counter overflows, or ISF indicates an out-of-frame condition, or SA indicates no output energy the counter is reset and a so-called waiting interval timer (not shown) is enabled. The waiting interval timer has a prescribed time interval, for example, 3 milliseconds, and is employed to avoid activating an alarm because of detecting short interval high error rates, for example, noise bursts and the like. At the end of the waiting interval a second 100 millisecond timer is triggered. A switch request is made and an alarm enabled, if during this second 100 millisecond interval the error pulse counter overflows, or ISF indicates an out-of-frame condition, or SA indictes no energy present. Switch request signal SR is supplied to a corresponding VMR-end switching control unit. Similarly, alarm signal V is supplied to an appropriate alarm circuit (not shown). If during the first 100 millisecond interval none of the error conditions occur, evaluation circuit 435 is reinitialized.

If during the first 100 millisecond interval, ISF indicates an out-of-frame condition, a 0.5 millisecond timer is triggered. If at the end of the 0.5 millisecond interval ISF still indicates an out-of-frame condition, a DS4 line drive signal insertion control signal is generated and supplied to input gate 440 of line drive section 404. This provides a good DS4 signal for downstream offices, thereby minimizing the possibility of multiple offices enabling alarms because of the same bad DS4 signal.

Once an alarm has been enabled, the 5-stage counter is reset and a one-second timer is triggered. If within the one-second interval the counter overflows, i.e., more than 31 errors have been observed, the alarm continues to be enabled and the one-second timer is retriggered and the counter is again reset. This process is iterated and the alarm continues to be enabled. If during the one-second interval the error bit counter does not overflow, and the circuit is in-frame and output energy is present, the alarm is terminated. This process insures that the alarm is not terminated until the error rate on the service line is below $10^{-7}$. Consequently, hysteresis is provided in the evaluation of parity error pulses PEP. That is to say, a switch request is made and an alarm enabled when an error bit rate of $10^{-6}$ is observed and dropped only when the error bit rate falls below $10^{-7}$. Additionally, if the DS4 line drive signal control signal is being generated, it is discontinued if during the one second interval the error rate counter does not overflow, and the circuit is inframe and there is output enerby present.

Line drive section 404 includes input gate 440, line drive unit 441 and energy detector 442. Gate 440 is employed to supply a service line DS4 signal from combiner 415 or a DS4 line drive signal from a corresponding DS4 signal generator to line drive 441 and, hence, to the output of the service line. Line drive unit 441 is employed to amplify the supplied DS4 format signal to obtain a desired output level. Energy detector 442 is employed to observe whether the DS4 output level is above a prescribed threshold. If not, an appropriate signal absent (SA) signal is supplied to evaluator 435.

Protection Data Multiplexer

Details of the protection data multiplexers (PDMs) employed in the system shown in FIG. 3 are depicted in FIG. 6. Many of the functions of the PDM are substantially identical to those of the VMR shown in FIG. 4 and described above. Accordingly, those elements of the PDM which are essentially identical to the corresponding elements in the VMR are similarly labeled and will not again be described in detail. Only the differences between the PDM and VMR elements will be high-lighted.

Accordingly, the PDM is divided into three sections, namely, high-speed section 601, framing section 602 and line-drive section 603.

High-speed section 601 is essentially identical to high-speed section 401 of the VMR shown in FIG. 4. The only differences being that: counter 410 is employed to yield clock signals CA; FCLK and RESET; demultiplexer 413 yields only SP1 and SP2; multiplexer 414 inserts X-bits in bit streams B1 and B2 in place of parity bits PP; and combiner 415 passes the 274 megahertz clock signal to line drive 603 in addition to the data signal. The X-bits to be inserted via multiplexer 414 in section 601 are supplied from a corresponding VMR-end switching control unit and contain protection switching information. Clock signals XC are obtained from framing section 602 for clocking multiplexer 414 to effect the desired X-bit insertion. The outputs from combiner 415 are a DS4 data signal including protection switching information and a 274 megahertz clock signal. Waveforms illustrating the high-speed timing signal clock, CA, RESET and FCLK are shown in FIG. 7.

PDM framing section 602 is substantially identical to VMR framing section 402 of FIG. 4. The main differences being that PDM framing section 602 does not extract X-bits from SP1 and that PDM framing section 602 generates XC timing signals which as shown in FIG. 8 correspond to the X-bit positions of the presently received DS4 signal. These XC timing signals are supplied to multiplexer 414 where they are employed to insert the X-bit data signals into bit streams B1 and B2 in essentially identical manner to insertion of parity signals PP in the VMR multiplexer. That is, the XC timing signals inhibit incoming X-bits in incoming bit streams B1 and B2 and allow the X-bits from the corresponding VMR-end control unit to pass. The desired XC timing signals are generated by employing X-bit clock decode logic 610 to decode, in a manner which will be apparent to those skilled in the art, desired phases of the divide-by-24 superframe clock. Consequently, decode logic 610 responds to prescribed logical states of subframe clock C1, phases C2 through C6 of the superframe clock and ISF to yield the XC timing pulses shown in FIG. 8. FIG. 8 also illustrates the relationships of the various phases of the timing signals employed in framing section 602. Circuit arrangements for generating the desired clock signals will be apparent to those skilled in the art. The XCLK signals are supplied to a corresponding VMR-end control unit, while in-superframe signal ISF is supplied to an alarm circuit.

Line-drive section 603 includes line-drive unit 611, energy detector 442 and high-pass filter 612.

Line-drive unit 611 responds to the incoming clock and data signals to amplify the data output from combiner 415 of section 601 to a desired level sufficient to drive the T4M protection line. The output from line-drive 610 is a 2.5 volt peak-to-peak AC signal at the T4M rate of approximately 274 megabits per second.

Outputs from line-drive unit 611 are supplied to filter 612 an energy detector 442 of section 603. Filter 612 is a 50 megahertz high-pass filter. The output from filter 612 is supplied to the protection line. Energy detector 442 merely compares the output from line-drive 611 with a prescribed threshold level to determine whether or not the DS4 signal is present. The output from energy detector 442 of section 603 is supplied to an alarm circuit.

VMR-End Switching Control

Figure 9A:
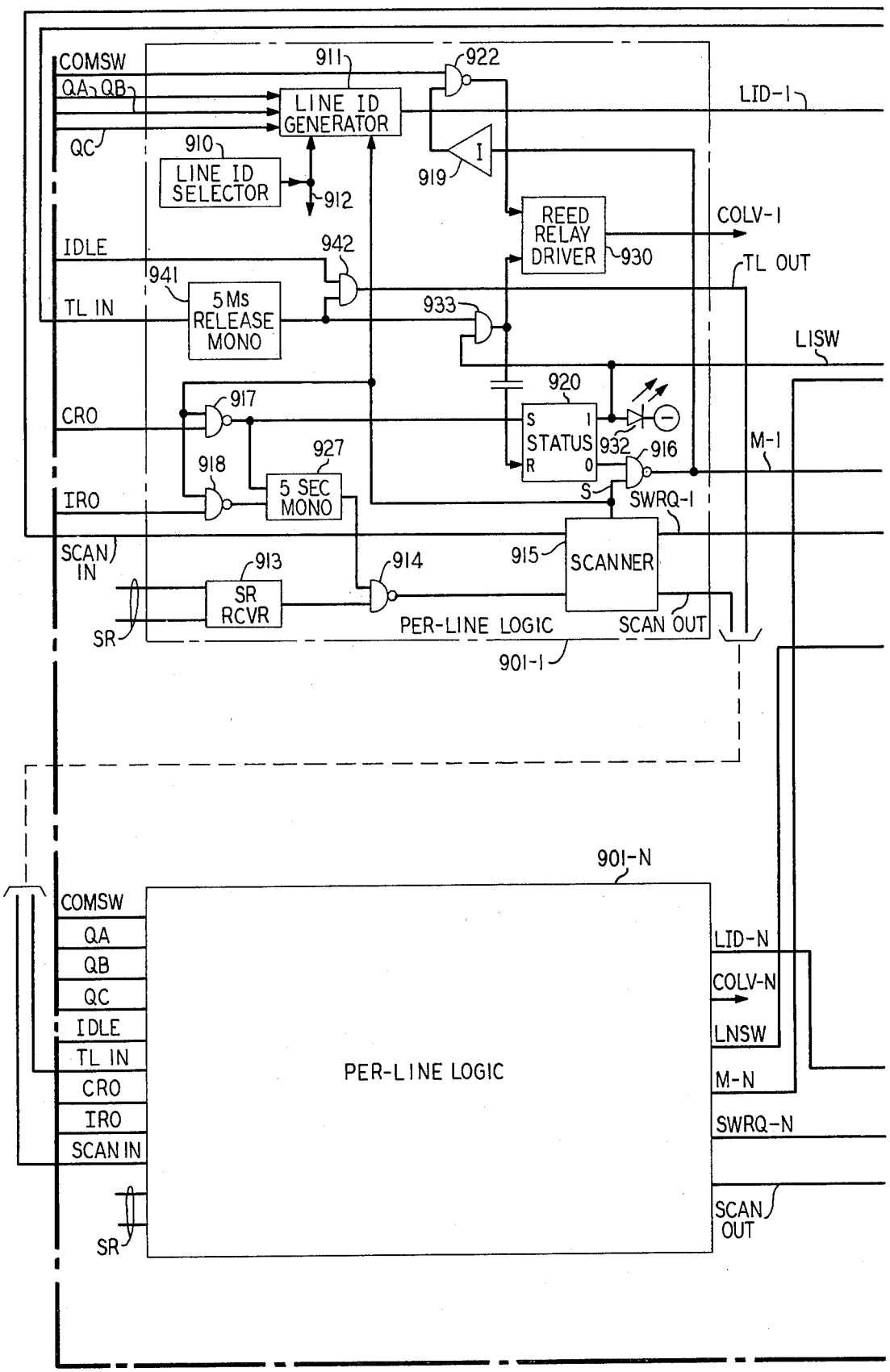

FIGS. 9A, 9B and 9C when assembled as shown in FIG. 9, depict in simplified block diagram form details of VMR-end switching control 242 utilized in the system shown in FIG. 3. The VMR-end control is employed to monitor all service lines terminated in a receive terminal for protection switch requests. In add-drop offices the VMR-end control is also arranged to be connected to a corresponding head-end control for effecting cross office transmission of X-bit information to realize protection switches in accordance with an aspect of this invention. Upon observing a switch request from a VMR, the VMR-end control checks the status of the protection line, i.e., available or busy. Dependent on whether the protection line is available or busy, an appropriate switch request message is generated and transmitted to all upstream offices. Additionally, the line-drive indication signals, LDA, are observed to determine whether a head-end switch has been made. Upon detecting absence of line-drive signals LDA, a head-end switch has been made and upon determining that the DS4 signal on the protection line is a good signal a VMR-end switch is made. If the DS4 signal is bad, an upstream failure is indicated and the protection switch is aborted. The VMR-end control also monitors itself for proper operation and generates test signals during intervals in which no switch requests are observed.

Moreover, if the switch request message does not originate in the office in which the particular VMR-end control is situated but is being transmitted from a downstream office, the VMR-end control logic arrangement will examine the message bit and modify it if necessary to indicate the availability of the protection line linking the receive terminal with the next upstream transmit terminal. This examination and modification of the message bit is, in accordance with an aspect of the invention, the basis for the nonhierarchical approach to protection switching control. Since a switch request passes through each office in the protection switching system until it reaches the head-end of the service line requesting a switch, the message bit of the switch message can be modified at any receive terminal that indicates the next upstream protection line is not available.

To realize these functions, the VMR-end switching control includes logic associated with each service line terminated in the receive office housing the VMR-end control unit, namely, per service line logic units 901-1 through 901-N. Typically, a maximum of N = 10 service lines are associated with a single protection line. Additionally, the VMR-end control unit includes common logic which is employed to respond to signals generated by each of per-line logic units 901 for effecting a protection switch. The common logic includes decision unit 902, timing control unit 903 and control unit 904.

Each of per-line logic units 901-1 through 901-N include essentially identical elements. They are assigned to a specific line and given a specific address to identify the line. Per-line units are provided only for service lines which are terminated in a particular office.

Line ID selctor 910 is employed to supply 8 logical signals identifying the associated service line to line ID generator 911 and via circuit path 912 to a line ID comparator employed in an upstream head-end switching control (not shown). Each of logic units 901 generates signals for initiating and completeing a protection switch. To this end, balanced switch request signals SR are received, for example, at per-line logic unit 901-1 from a VMR associated with the receive end of a service line. Normally, SR is a logical 0 and changes to a logical 1 when the corresponding VMR requests a switch. The balanced SR signal is converted via SR receiver 913 to a single-ended signal which, in turn, is supplied to NAND gate 914. When a scan pulse is received, i.e., SCAN IN changes from a logical 0 to a logical 1, sampling pulse S is generated by scanner 915. Pulse S is supplied to NAND gates 916, 917, 918 and line ID generator 911. Details of scanner 915 are shown in FIG. 11 to be discussed below. When a switch request is present, scanning pulse SCAN IN is inhibited by scanner 915. If no switch request is present at the specific per-line logic, the scanning pulse is immediately supplied serially via SCAN OUT to the other per-line logic units until a switch request is observed. Preferably, the scanning pulse generation is self starting. Thus, an odd number of inversions of the pulses are required. This is realized in well-known fashion to obtain ring-type oscillator action by gates in scanner 915, scan inverter 950 in control 903 and scan detector 951 in decision 902. Assuming a switch request is received at per-line logic 901-1, i.e., SR = 1 and the scan pulse is inhibited. Then, scanner 915 yields output pulse SWRQ-1 which changes from logical 1 to 0 indicating a switch request, SWRQ-1 is supplied to NAND gate 921 of decision unit 902. Output M of NAND gate 916 changes from 1 to 0 provided there was no prior protection switch as indicated by status flip-flop 920. That is, if the protection line was already switched to the service line flip-flop 920 would yield a logical 0 at output 0 thereby inhibiting gate 916.

Assuming a switch request has been made, decision unit 902 yields request signal R which resets counter 925 via reset unit 945 in timing control 903. This causes phases QA, QB and QC of counter 925 in timing control 903 to be supplied to line ID generator 911. Generator 911 responds to scan sampling pulse S and phase QA, QB and QC (FIG. 10) from counter 925 to yield the identification address LID-1, of the requesting service line LID-1 is an 8-bit pattern including two logical 0s followed by six line identification bits selected by line ID selctor 910. Each line is given a unique identification address. The 8-bits are clocked out of generator 911 and supplied to NAND gate 926 in timing control 925 for inclusion in the 9-bit switch request message to be discussed below.

After an appropriate interval to allow head-end switching operations to occur, decision unit 902 yields, as discussed below, either pulse signal IRO, incorrect response observed, or pulse signal CRO, correct response observed. IRO is supplied to NAND gate 918 while CRO is supplied to NAND gate 917. Output S from scanner 915 is also supplied to NAND gates 917 and 918. Either CRO or IRO will trigger monostable multivibrator 927. The unstable interval of monostable 927 is set at a predetermined value, for example, 5 seconds. The output from monostable 927 is supplied to NAND gate 914. During its unstable interval, monostable 927 inhibits gate 914. Consequently, switch request signal SR is inhibited and scanner 915 no longer inhibits the scanning pulse. This frees the scanning pulse for a 5 second interval to propagate through the per-line logic units and check for other switch requests. If a correct response is observed, decision unit 902 also yields a COMSW pulse having a 5 millisecond interval which precedes CRO. The COMSW pulse is supplied to NAND gate 922 in per-line logic 901-1. If the service line has not been previously switched, output M from gate 916 is a logical 0 and the output of inverter 919 is a logical 1. Consequently, reed relay driver 930 responds to the negative going, i.e., logical 1 to 0, output from gate 922 to generate positive pulse signal COLV having an amplitude sufficient to drive the reed relays for closing appropriate contacts in the receive switches corresponding to the tail-ends of the requesting line and protection line. Thus, the output of the protection line is connected to the receive terminal of the requesting line. After the switch is completed, signal CRO, i.e., the output of gate 917 sets status flip-flop 920 to yield a logical 1 at output 1 to indicate the switch i.e., L1SW = 1, and light emitting diode (LED) 932 is illuminated. L1SW output of status flip-flop 920 is also supplied to AND gate 933 and to OR gate 934 in control 904.

A VMR-end switch is released when scan detector 951 in decision unit 902 yields a negative going pulse TL. Pulse TL triggers release monostable multivibrator 941 in per-line logic 901-1. Monostable 941 has a predetermined unstable interval, for example, 5 millisecond. The output from monostable 941 is supplied to AND gate 933 and to AND gate 942. If output 1 of status flip-flop 920 is a logical 1, reed relay driver 930 is operative to supply a negative pulse signal having a prescribed amplitude and interval sufficient to open the reed relay contacts and remove the switch. If at the end of the unstable interval of mono-stable 941, the output from IDLE flip-flop 943 in decision logic 902 is a logical 1, the trigger pulse TL out is supplied to the next per-line logic unit.

Decision unit 902 is employed to monitor each of per-line logic units 901 for protection switching requests. Upon detecting a switch request, decision unit 902 determines the status of the protection line and upon occurence of a prescribed sequence of events generates a command to effect a receive or VMR-end switch of the protection line to the requesting service line DROP terminal. To this end, all switch requests signals SWRQ-1 through SWRQ-N from per-line logic 901-1 through 901-N are supplied to NAND gate 921. Additionally, output TL from scan detector 951 is also supplied to NAND gate 921. Gate 921 yields a single output signal R. SWRQ and TL are normally logical 1s and become logical 0 for a switch request. Thus, R is normally a logical 0 when no switch or test request is present and a logical 1 when a switch or test request (TL) is received. Signal R is supplied to decision logic 952, to clock input logic 953 in timing control 903 and to message generator logic 954 in control 904.

Several modes of operation of the VMR-end switching control and, hence, decision unit 902 are possible. Two are "normal" modes of operation relating to switch requests and repeat requests, while four are modes which prevent a successful protection switch.

Figure 12:
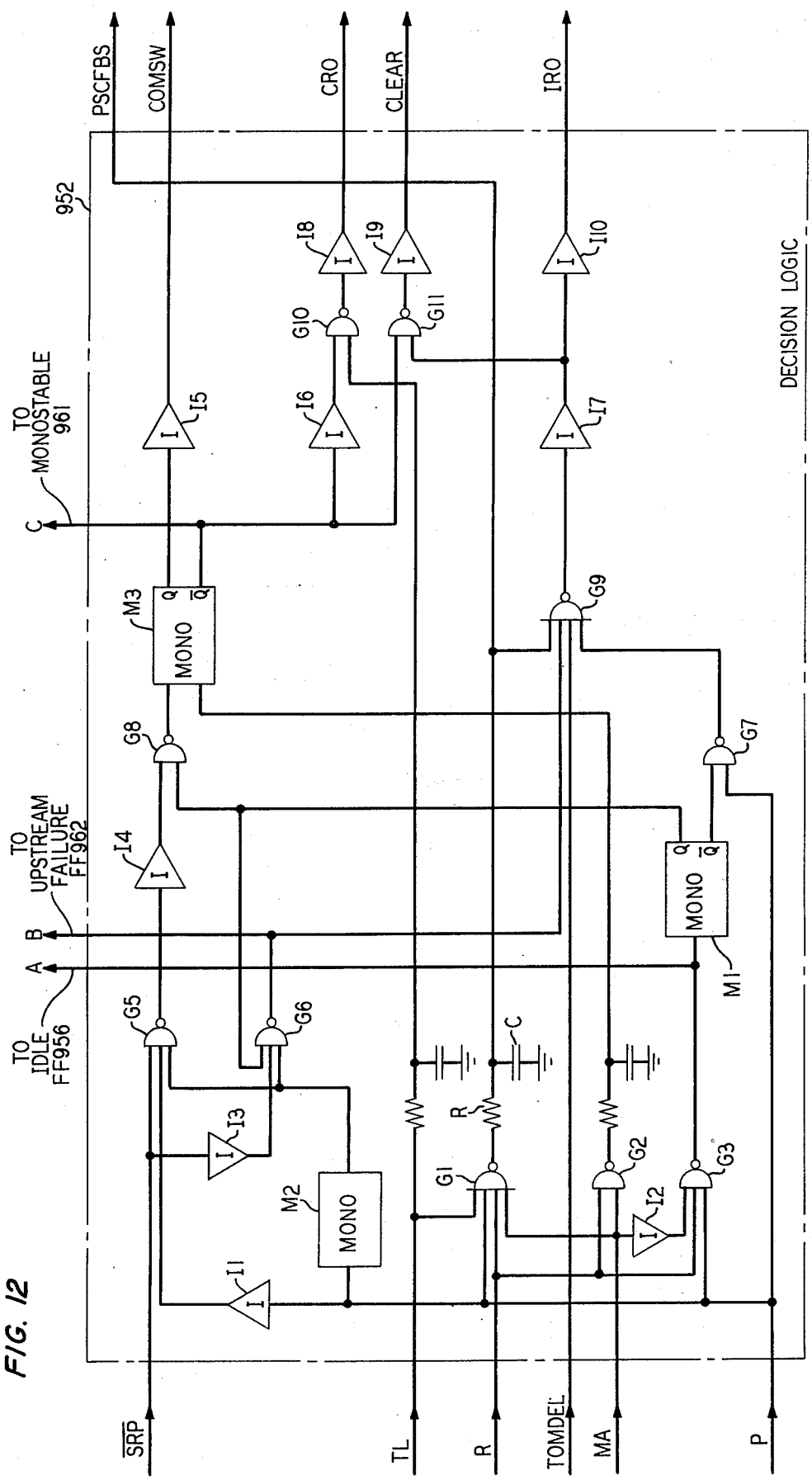
FIG. 12 depicts details of the decision logic unit used in the VMR-end switching control of FIG. 9.

The so-called normal modes of operation are addressed first. When a service line VMR first requests a switch, MA from message generator 954, as described below, is a logical 0, R from NAND gate 921 is a logical 1, and P from LDP receiver 955 is a logical 1 indicating a line-drive signal on the protection line. These conditions MA = 0, R = 1, and P = 1 cause a monostable having a prescribed unstable interval, for example, 100 milliseconds, in decision logic 952 to be triggered and also causes decision logic 952 to yield an output which, in turn, resets idle flip-flop 956 to yield a logical 0 at its idle output. The idle signal is supplied to NAND gate 942 in per-line logic 901 as discussed above. Details of decision logic 952 are shown in FIG. 12. discussed below. During the 100 millisecond unstable interval of the monostable, switch requests are being sent from timing control 903 to the upstream offices of the protection lines. When the appropriate head-end control unit responds and makes a head-end switch bridging the ADD terminal of the service line to the protection line, the DS4 line drive signal disappears from the protection line. Consequently, LDP and, hence, P will change from a 1 to a 0. This change of state causes another monostable multivibrator having a prescribed unstable interval, for example, 10 milliseconds, in decision logic 952 to be triggered. This 10 millisecond interval is merely a waiting interval to allow regenerators in the protection line to synchronize on the new signal being supplied from the service line. At the end of the waiting interval, a check is made of the protection line to determine whether a good signal has replaced the line drive signal. This is evidenced by the continued presence of SRP = 0, $\overline{SRP}$ = 1 from the PVMR. Thus, if at the end of the 10 millisecond waiting interval, a good signal is present and it is not a line-drive signal, another monostable multivibrator in decision logic 952 is triggered having a prescribed interval of, for example, 5 milliseconds, which causes output COMSW to change from a logical 0 to logical 1 for 5 milliseconds. Signal COMSW is supplied to NAND gate 922 on per-line logic 901-1 to effect a switch as discussed above.

The trailing edge of COMSW causes three events to occur, namely, the CRO output from decision logic 952 changes from logical 0 to logical 1 indicating a successful switch has occurred, the CLEAR output changes from logical 1 to logical 0 resetting counter 925 and shift register 960 in timing control 903, and retriggerable monostable multivibrator 961 having a prescribed unstable interval of, for example, 12 seconds, is retriggered. Monostable 961 is employed to indicate whether or not a switch request has been made within its unstable interval. So long as monostable 961 is retriggered during its unstable interval it will not time-out. If not retriggered upon timing out, monostable 961 generates TS and scan detector 951 yields test request signal TL which causes a test switch request signal to be generated for exercising the protection line.

After a switch has been made, the switching control periodically repeats the switch request for purposes of enabling it to recover from abnormal conditions. During a repeat request, signals R and MA are logical 1s which cause the 5 millisecond monostable in decision logic 952 to be triggered. Consequently, decision logic 952 outputs COMSW, IRO and CLEAR are generated and used for purposes as described above.

Four conditions may occur which prevent a successful protection switch and result in decision logic 952 yielding ouputs CLEAR = 0 and IRO = 1. These outputs cause a temporary cancellation of the switch request in per-line logic 901-1 as described above. These conditions are:

If a head-end switch is not made, the 10 millisecond monostable multivibrator is not triggered. Consequently, at the end of the 100 millisecond interval, decision logic 952 yields outputs CLEAR = 0 and IRO =1;

If 10 milliseconds after the line-drive signal disappears, i.e., P = 0, an associated PVMR indicates a switch request, i.e., SRP = 1, the signal on the protection line is bad indicating an upstream failure and yields outputs CLEAR = 0 and IRO = 1. Decision logic 952 also yields a signal for setting upstream failure flip-flop 962. In turn, LED 963 is illuminated and a failure indication is supplied to a remote surveillance system. Upstream failure flip-flop 962 must be either manually or remotely reset.

If a protection switch request is received during intervals that the protection line is not available, i.e., P = O, output TOMDEL from delay 965 causes decision logic 952 to yield outputs CLEAR = 0 and IRO = 1.

The system updates itself periodically at approximately five-second intervals. If a repeat request is generated, i.e., MA = 1 and R = 1, but the protection line has a line-drive signal present, i.e., P = 1, this indicates that the head-end switch has been dropped inadvertently. A delay in signal propagation within decision logic 952 is employed to attempt re-establishing the head-end switch. Outputs PSCFBS indicates this failure. This output is supplied via NAND gate 966 to PSCF flip-flop 967 in control 904. Flip-flop 967 indicates a protection switch failure and illuminates LED 968. This VMR-end failure indication is combined with head-end failure indication HPSCF via OR gate 969 and supplied to an alarm system.

If there is no switch request for a prescribed interval, a test message simulating a switch request is initiated periodically by monostable 961. Scan detector 951 responds to the scan pulse and stable output of monostable 961 to generate a change from 1 to 0 on output TL (see FIG. 11). TL is supplied to shift register 960, per line logic 901-1, NAND gate 921 and decision logic 952. NAND gate 921 responds to yield switch request R. TL also triggers the 5 millisecond monostable in decision logic 952 enabling generation of the test message for 5 milliseconds. Thus, a 5 millisecond test is performed during each 12 second interval that no switch request is made. TL is also used to release any receiver switch, as described above, which may have been erroneously made as a result of the test message or some fault in the system. Finally, TL sets idle flip-flop 956 which, in turn, generates IDLE. IDLE propagates through all of per-line logic units 901 to release any VMR-end switches as described above. The generation of test message TL is inhibited if the test message is being transmitted from a downstream VRM-end control. This inhibition is realized by retriggering monostable 961 during intervals that such a downstream test message is present.

Scan detector 951 includes logic elements for continuing propagation of the scanning pulse and for generating test request signal TL in a manner which will be apparent to those skilled in the art. The scanner employed in detector 951 is substantially identical to scanner 915 illustrated in FIG. 11. Additionally, scan detector 951 includes a 1.5 second timer which is retriggered whenever the scanning pulse arrives. If for some reason the scanning pulse stops propagating through the system for more than 1.5 second, the timer times-out and a logical 0 is generated at SCANF. SCANF is supplied via AND gate 966 to the set input of flip-flop 967, again indicating a protection switching failure.

Timing control 903 is employed to assemble the 9-bit protection switching message, to generate timing signals for effecting generation of the switching message and to receive cross office (CO) X-bit transmissions from the head-end control of the next downstream protection line to effect, in accordance with an aspect of the invention, transmission upstream of switch request and test messages from downstream offices.

Control signal generator 925 is employed to generate signals for controlling the assembly and outputting of the 9-bit switch request message. Generator 925 includes a five stage countdown, i.e., divide-by-32 arrangement and associated logic (not shown) for generating the sequence of waveforms shown in FIG. 10. When a service line has requested a switch, output R from decision unit 902 changes from a logical 0 to a logical 1 thereby enabling clock input gate 953 to supply single-ended XCLK signals from XCLK RCVR 970 to generator 925. The XCLK signals are supplied from a corresponding upstream protection data multiplexer (PDM). Additionally, signal R is supplied via inverter 975 to reset unit 945 and monostable multivibrator 976. Reset unit 945, resets generator 925 and shift register 960 to an initial condition. Generator 925 responds to the XCLK signals to divide SCLK by 32 and to generate the sequence of waveforms shown in FIG. 10.

Three phases of clock signals, namely, QA, QB and QC (FIG. 10) are supplied to line ID generators 911 on each of per-line logic 901-1 through 901-N for purposes of generating the service line ID address signal. As indicated above, the line ID includes two logical 0s followed by the 6-bit line ID which are supplied to NAND gate 926. The divided clock outputs are then decoded, in a manner which will be apparent to those skilled in the art, to yield a plurality of clock or control signals.

Signal C (FIG. 10) is supplied to enable input gate 971 for passing the output of gate 926 to shift register 960. Signal F includes 9 clock pulses which are employed to clock the prefix bit and line ID bits into shift register 960. The first logical 0 of the ID signal is not employed. NAND gate 926 inverts the second logical 0 which becomes a logical 1 and is the message signal prefix bit. The 9 clock pulses (F) are followed by two time slots in which message bit DA (8th-bit) from control unit 904 and the parity bit (9th-bit) from parity calculator 972 are inserted in parallel in the 8th and 9th positions of register 960, respectively. Waveform H converts register 960 to a parallel insertion mode and waveform I gates message bit DA into the 8th bit position without affecting the prefix and ID bits. During this interval, waveform C disables input gate 971.

Parity calculator 972 is employed to calculate the parity of the 8-bits in register 960. Even parity is employed. Thus, if the number of logical 1s in the first 8-bits is even, a logical 0 is inserted via waveform E into the 9th bit position of register 960, if odd, a logical 1 is inserted. This parity calculation is achieved by employing a logic tree of Exclusive OR gates (not shown) in well-known fashion.

Figure 10:
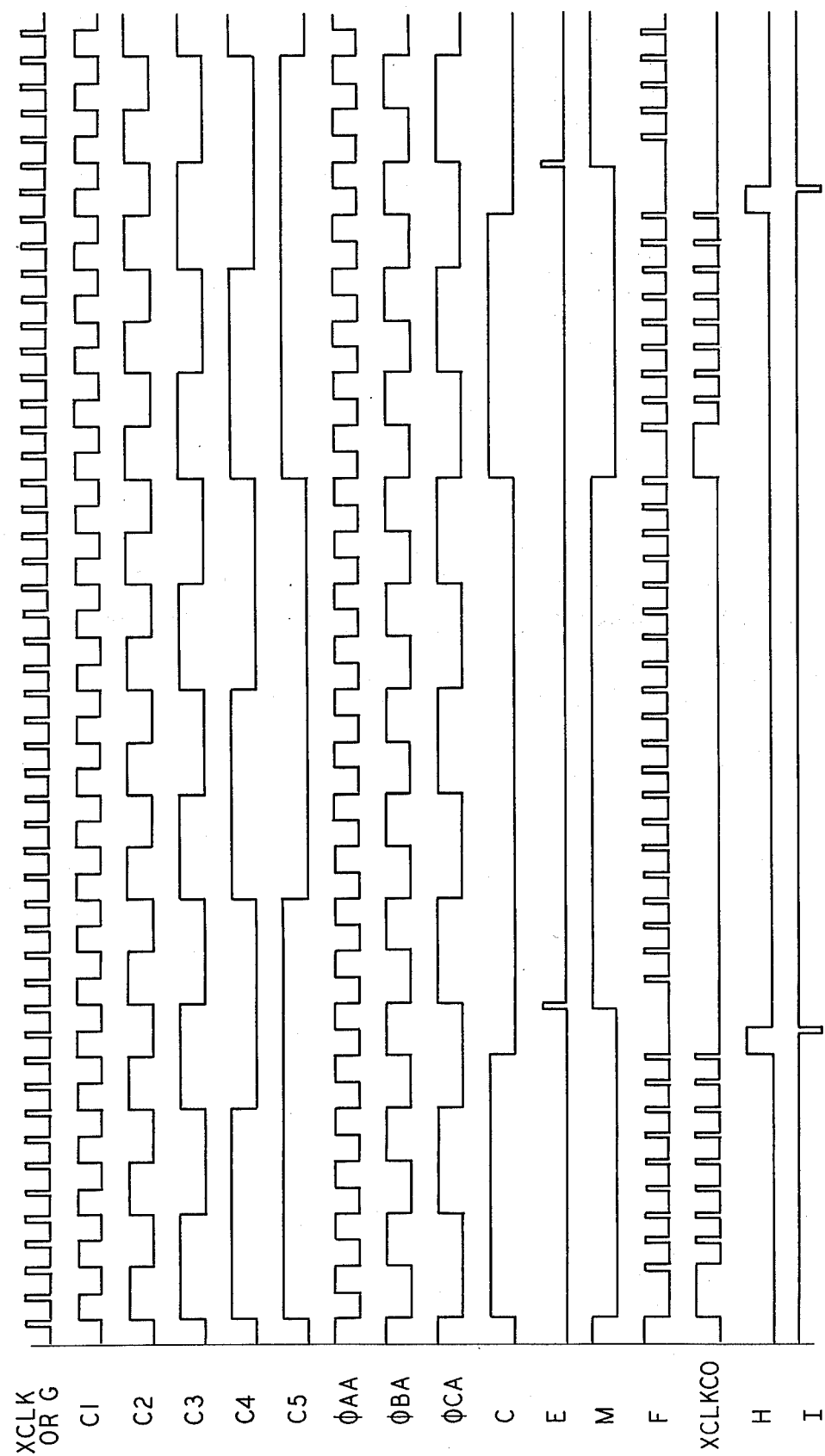
FIG. 10 is a sequence of waveforms useful in describing operation of the VMR-end switching control of FIG. 9.

During the interval in which the 9-bit message signal was assembled, output gate 973 was disabled by waveform M (FIG. 10). This resulted in logical 0s being clocked into the X-bit positions of the upstream DS4 signal by the corresponding upstream PDM. Gate 973 is enabled by clock M to pass serially the 9-bit message, i.e., X-bits, to X-bit output unit 974 where they are converted into balanced form. In turn, the 9-bit switch request message is supplied to the corresponding upstream PDM. The PDM inserts the X-bits into the upstream DS4 message for transmission to the next upstream head-end control unit. Since generator 925 includes a divide-by-32 count down unit, the basic switch request period is 32-bits. Consequently, the output from gate 973 includes the 9-bit switch message plus 23 logical 0s. The 23 logical 0s effectively separate the switch request messages.

NAND gate 926 is arranged to supply fictitious LID signals to input gate 971 when no message requests are present. These fictitious LID signals are employed to assemble a test message when decision unit 902 yields test request signal TL. Test request TL is operative to cause decision unit 902 to yield a message request output R. Consequently, timing control 903 operates to generate a test 9-bit test message which is employed to exercise the idle protection line.

Cross office signals XBITCO, RESCO and XCLKCO are employed for transmitting switch request and test messages between a head-end switching control unit and a VMR-end switching control unit in an add-drop intermediate office, for example, between head-end control 235-2 and VMR-end control 242-1 as shown in FIG. 3. The VMR-end control unit reinserts the cross office X-bits via a PDM into the upstream DS4 signal of the upstream protection line. Both switch request messages and test messages are transmitted through each office in this manner thereby unburdening the communications line because multiple messages need not be sent upstream from each office.

Accordingly, RESCO and XBITCO signals are supplied from the head-end control of the next downstream protection line to timing control 903. Similarly, XCLKCO signals are supplied from control signal generator 925 to the downstream head-end control to be discussed below. RESCO is supplied to reset 945 for purposes of initializing generator 925 and register 960. XBITCO signals are supplied to NAND gate 977 and to scan inverter 950. Normally SCAN-OUT is a logical 1 and XBITCO is a logical 0. When the SCAN-OUT signal being supplied to scan inverter 950 from per-line logic unit 901-N is a logical 0 and XBITCO signals are present, monostable 976 is triggered into an unstable state and yields a logical 1 at output Q and a logical 0 at output $\overline{Q}$. The unstable interval of monostable 976 is, for example, 40 milliseconds. Output Q of monostable 976 is signal T which is supplied to enable NAND gate 977 and clock input gate 955, and to enable the resetting of reset 945. Reset 945 is enabled to respond to RESCO for resetting control generator 925 and register 960 to initial conditions. NAND gate 977 supplies bits of XBITCO via input gate 971 to shift register 960 for the unstable interval of monostable 976. Signal T is also supplied to message generator logic 954 and to gate 978. Message generator 954 is operative to change downstream message bit MP, i.e., 8th-bit of the incoming message signal if the next upstream protection line is not available. That is, if the next protection line is busy the 8th-bit is changed from logical 0 to logical 1 via message generator logic 954 and DA = 1 is inserted into the 8th-bit position of register 960. Operation of timing control 903 related to calculating parity and supplying the switch message to the corresponding PDM is as described above. XCLKCO signals, as shown in FIG. 10, are supplied to the head-end control unit for purposes of synchronizing the VMR-end and head-end control units in order to effect properly the cross office transmission of XBITCO signals.

Control unit 904 is employed primarily to generate message bit DA, i.e., 8th-bit of the protection switch request message. Message generator 954 is employed to generate message bit DA which is supplied to shift register 960 of timing control 903. Message bit DA is a logical 0 if the service line is requesting a "new" protection switch to be set up as indicated via $\overline{MA}$ from NAND gate 923 and the protection line is available as indicated by P from LDP receiver 955, or if a switch is already set up and the service line is repeating the request. Message bit DA is a logical 1 if the service line is requesting a switch and the protection line is not available. If the switch request message does not originate in the instant office but is being transmitted through from a downstream office as indicated by signal T from monostable 976. Message generator 954 examines the downstream message bit MP from shift register 960 and modifies it, if necessary, to indicate the availability of the protection line terminated in the instant office. Again, this observation and changing of downstream message bit MP is, in accordance with one aspect of the invention, the basis for a nonhierarchical protection switching control system. The downstream switch message is transmited through each ADD-DROP office. Consequently, the message bit is modified at any VMR-end control unit at which the protection line is not available.

Message bit DA is generated by message generator 954 according to the following relationship:

$$DA = (MP + \overline{MP}\,\overline{P})\,\overline{R}\,T + \overline{P}\,\overline{T}\,\overline{MA}\,R \quad (1)$$

where MP is the downstream message bit passing through an ADD-DROP office,

P = 1 if the protection line is available,

R = 1 when a service line requests a protection switch,

T = 0 if the message originates at the instant VMR-end control,

MA = 0 for a first switch request and MA = 1 for a repeat request.

Message generator logic 954 yields a signals at circuit point 979 which changes from a logical 1 to 0 when a new switch request is received from one of per-line logic units 901 and the protection line is not available, i.e., P = 0. This 1 to 0 transition triggers delay 965 and monostable 980. Delay 965 yields a pulse transition TOMDEL (two or more requests delayed) at the end of a predetermined delay interval, for example, 5 milliseconds. The delay interval is to allow other timing sequences to be completed. TOMDEL is supplied to decision logic 952 in decision unit 902 to terminate the switch request. Monostable 980 yields a signal, TOM (two or more requests), for its unstable interval of, for example, 12 seconds. TOM is supplied to an alarm panel. Monostable 980 is retriggered at 5 second intervals so long as the protection line is still unavailable. Consequently, a continuous alarm is issued. Details of message generator logic 954 are shown in FIG. 13 to be described below.

As discussed above, SCANF and PSCFBS are the two signals which indicate a failure in the protection switching control. SCANF is normally a logical 1 and becomes a logical 0 when the 1.5 second timer of scan indicator 951 of decision unit 902 times-out indicating that the scanner has stopped. PSCFBS is normally a logical 1 and becomes a logical 0 when a line drive signal is on the protection line after a switch was made. Either or both of these inputs will cause a change of state of AND gate 966 and trigger PSCF flip-flop 967 to yield PSCF and PSF signals and illuminate LED 968 as described above. This indicates a protection switching control failure (PSCF). PSCF flip-flop 967 is reset manually or from a remote location via an appropriate signal on RESET.

All of line switched indications LSW-1 through LSW-N are combined in OR gate 934. When a line is switched, OR gate 934 yields a logical 1 which illuminates LED 981 and disables gate 978. LED 981 indicates a line has been switched. Gate 978 is normally enabled when no lines are switched to yield an output TRIG whenever signal T indicates a switch request message is being supplied from a downstream office. This output, i.e., TRIG signal is supplied to monostable 961 in decision unit 902 to retrigger it so that no test switch message is generated in the instant VMR-end control when a switch request or test message is received from a downstream office. Again, this eliminates the need to generate and transmit test messages at each VMR-end control unit for exercising the protection system.

FIG. 11 depicts details of scanner 915 utilized in per-line logic units 901 and scan detector 951 of the VMR-end switching control illustrated in FIG. 9. The outputs shown in parenthesis are for the scanner employed in scan detector 951. Scanner 915 includes NAND gates G1, G2 and G3, inverters I1, I2 and I3, resistor R and capacitor C. Depending upon inputs SCAN-IN and SR either SCAN-OUT or sampling S and switch request SWRQ are generated. Assuming initial conditions of SCAN-IN = 0 and SR = 1, the output of gate G1 is at 1, input to inverter I1 is a 1, SCAN-OUT is a 0, output of gate G2 is a 0, output of gate G3 is a 1, S = 0, and SWRQ = 1. A change in SCAN-IN from a 0 to 1 causes the output of G1 to become a 0. This, in turn, causes the output of gate G2 to become a 1. Resistor R and capacitor C delay the change in the output of gate G1 and, consequently, two inputs of gate G3 are 1s. Now if SR = 1, indicating a switch request, the output of gate G3 becomes a logical 0. Feedback to gates G1 and G2 maintains gate G3 in a state to yield a logical 0 output so long as SR = 1. In turn, sampling pulse S = 1 and switch request SWRQ = 0 are generated. SCAN-OUT remains a logical 0 and scanning is inhibited. If, instead, no switch request is received, i.e., SR = 0, then there is no change in the output of gate G3 and after the delay caused by the RC time constant a 0 to 1 SCAN-OUT pulse is generated.

FIG. 12 depicts details of decision logic 952 of decision unit 902 employed in the VMR-end switching control shown in FIG. 9. Decision logic 952 responds to inputs $\overline{SRP}$, TL, R, TOMDEL, MA and P for generating a plurality of outputs, namely, PSCFBS, COMSW, CRO, CLEAR, IRO, A, B and C. The so-called two normal modes of operation described above are described first.

Thus, assuming a new switch request is detected and the protection line is available, then, under "normal" conditions MA = 0, R = 1, P = 1, TL = 1, TOMDEL = 1 and $\overline{SRP}$ = 1. These conditions cause G3 to yield a 1 to 0 change of state which triggers monostable M1 and is supplied (A) to reset idle flip-flop 956. Monostable M1 has a prescribed unstable interval of, for example, 100 milliseconds. During this unstable interval monostable M1 output Q = 1 and output $\overline{Q}$ = 0. Since P = 1 and $\overline{Q}$ of M1 = 0 gate G7 is disabled while a logical 1 is supplied from Q of M1 to inputs of G6 and G8. If during the 100 millisecond interval a head-end switch is made P changes from 1 to 0 and monostable M2 is triggered. Monostable M2 has an unstable interval of, for example, 10 milliseconds and yields a logical 0 during this interval. This is a waiting interval as described above and gates G5 and G6 are disabled. If at the end of the waiting interval a good signal is observed on the protection line SRP = 0, $\overline{SRP}$ = 1, gate G5 yields a logical 0 and inverter I4 supplies a logical 1 to gate G8. Since Q from M1 is a 1 gate G8 yields a 1 to 0 transition which triggers monostable M3. Monostable M3 has a prescribed unstable interval of, for example, 5 milliseconds and yields a logical 0 on output Q and a logical 1 on output $\overline{Q}$ (C). Consequently, I5 yields COMSW = 1 for a 5 millisecond interval. At the termination of the 5 millisecond interval three things occur. Inverter I6 supplies a 0 to 1 change to gate G10 which yields a 1 to 0 change. The output from gate G10 is inverted via inverter I8 and CRO changes from 1 to 0, indicating a successful switch. The 1 to 0 change in $\overline{Q}$ of M3 causes the output of gate G11 to change from 0 to 1, which, in turn, is inverted by I9 to yield a 1 to 0 change in CLEAR. Since all the inputs to gate G9 are logical 1s, G9 yields a 0 and I7 yields a 1 and I10 yields IRO = 0.

A second normal mode of operation of decision logic 952 occurs after a switch has been made and repeat request signals are periodically generated. During a repeat request MA = 1, R = 1, P = 0, TOMDEL = 1, TL = 1 and $\overline{SRP}$ = 1. MA = 1 and P = 1 cause gate G2 to yield a 1 to 0 transition which triggers monostable M3 and causes COMSW, CRO and CLEAR signals to be generated as described above.

Four conditions may occur which prevent a protection switch. Signals corresponding to these conditions are supplied to gate G9. Normally, the inputs to G9 are all logical 1s. Consequently, G9 yields a logical 0, inverter I7 yields a 1 enabling gate G11, and inverter I10 yields IRO = 0.

One possible condition is if a head-end switch is not made P remains a 1 and M2 is not triggered. Consequently, at the end of the 100 millisecond interval of M1 gate G7 yields a logical 0. This logical 0 disables G9 yielding a 1. In turn, inverter I7 yields a 0 disabling G11 causing I9 to yield CLEAR = 0. Similarly, inverter I10 yields IRO = 1.

A second possible condition is that after the line drive signal disappears indicating a head-end switch and triggering M2 $\overline{SRP}$ = 0 indicating a switch request from the protection line PVMR. Inverter I3 inverts the $\overline{SRP}$ = 0 and gate G6 responds to the stable output of M2 and Q of M1 to generate a logical O (B). This logical 0 is supplied to set upstream failure flip-flop 962 and to disable gate G9. CLEAR = 0 and IRO = 1 signals are generated as described above.

A third condition is when a switch request is received and the protection line is not available, i.e., P = 0. Approximately, 5 milliseconds after the switch request TOMDEL from control 904 (FIG. 9) changes from a 1 to a 0. Consequently, gate G9 is again disabled and CLEAR = 0 and IRO = 1 are generated as described above.

Finally, a fourth possible condition may occur in which a repeat request is generated, i.e., MA = 1 and R = 1 but the protection line has the line-drive signal on it, i.e., P = 1. 62 This indicates an inadvertent drop of the head-end switch. With inputs MA = 1, R = 1, TL = 1 and P = 1 gate G1 yields a change from a logical 1 to 0. This change in the output from G1 is delayed by resistor R and capacitor C for approximately 2 milliseconds from being supplied to gate G9. This delay interval allows the VMR-end control time to attempt re-establishing the head-end switch. If the switch is not re-established PSCFBS changes from 1 to 0 and gate G9 is disabled. Consequently, CLEAR = 0 and IRO = 1 are generated as described above.

FIG. 13 shows details of message generator logic 954 of control unit 904 employed in the VMR-end switching control illustrated in FIG. 9. The primary purpose of logic 954 is to generate message bit DA, i.e., the 8th-bit of the switch request message. Additionally, logic 954 yields an indication of whether the switch request is a new request or a repeat request and alarms if a request is received and the protection line is not available. These functions are achieved by observing inputs MP, R, T, $\overline{MA}$ and P to yield DA in accordance with equation 1 and to yield MA and an output at circuit point 979 in accordance with prescribed rules.

Briefly, MP = 0 and T = 0 when there is no XBITCO transmission and MP = 1 or 0 and T = 1 when there is XBITCO transmission. $\overline{MA}$ = 1 for a new switch request and $\overline{MA}$ = 0 for a repeat request. R = 1 for a switch request from a local service line. P = 1 if the protection line is available. DA = 1 if the protection line is not available and DA = 0 if the protection line is available.

Operation of message generator logic 954 is best summarized by the following tables. Table I shows several sets of input signals A through G while Table II shows the logical states at the outputs of the circuit elements of logic 954 for the input indicated in Table I.

TABLE I

| Input | A | B | C | D | E | F | G |
|---|---|---|---|---|---|---|---|
| MP | 0 | 0 | 0 | 0 | 0 | 1 | 1 |
| T | 0 | 0 | 0 | 1 | 1 | 1 | 1 |
| MA | 1 | 1 | 0 | 1 | 1 | 1 | 1 |
| R | 1 | 1 | 1 | 0 | 0 | 0 | 0 |
| P | 1 | 0 | 0 | 1 | 0 | 1 | 0 |

TABLE II

| Circuit Element | INPUT CONDITION | | | | | | |
|---|---|---|---|---|---|---|---|
|  | A | B | C | D | E | F | G |
| I1 | 0 | 1 | 1 | 0 | 1 | 0 | 1 |
| I2 | 0 | 0 | 0 | 1 | 1 | 1 | 1 |
| I3 | 1 | 1 | 1 | 0 | 0 | 0 | 0 |
| I4(MA) | 0 | 0 | 1 | 0 | 0 | 0 | 0 |
| I5 | 1 | 1 | 1 | 1 | 1 | 0 | 0 |
| G1 | 1 | 0 | 0 | 1 | 0 | 1 | 1 |
| G2 | 0 | 1 | 1 | 0 | 1 | 1 | 1 |
| G3 | 1 | 1 | 1 | 1 | 0 | 0 | 0 |
| G4 | 1 | 0 | 1 | 1 | 1 | 1 | 1 |
| G5(DA) | 0 | 1 | 0 | 0 | 1 | 1 | 1 |
| G6(979) | 1 | 0 | 1 | 1 | 0 | 1 | 0 |

The above tables summarize a number of the output modes of logic 954 for a number of input conditions in order to illustrate its operation. Additional input combinations are possible, for example, a new request being received (R = 1) during cross office X-bit transmission. However, the resulting outputs are readily obtainable from an analysis of the above tables taken in conjunction with the circuit diagram of FIG. 13.

Head end Switching Control

Figure 14A:
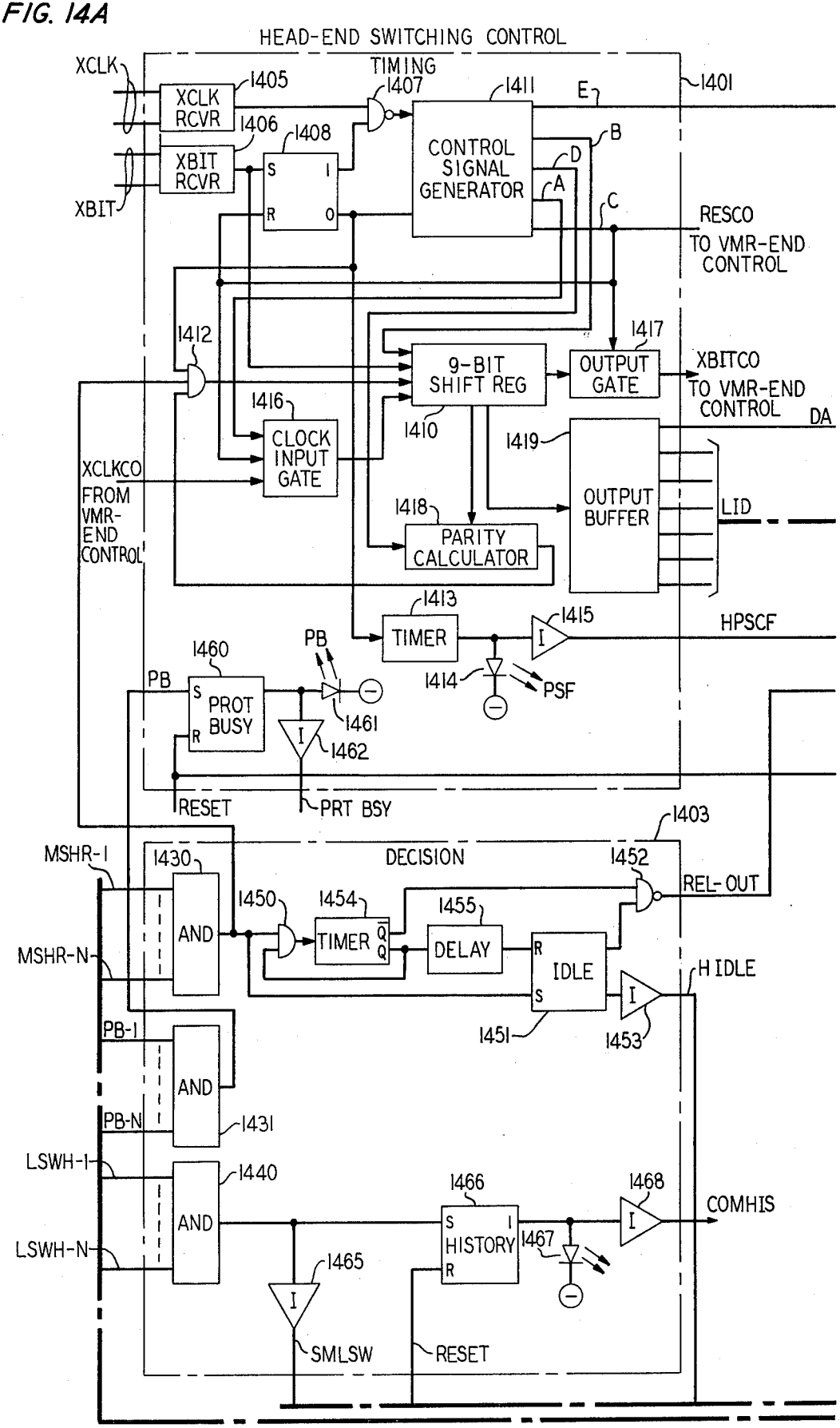

FIGS. 14A and 14B when assembled as shown in FIG. 14 depict details of a head-end switching control unit employed in the protection switching arrangement illustrated in FIG. 3. The primary purpose of the head-end control unit is to receive X-bits and XCLK signals including protection switching messages from a corresponding PVMR to effect a head-end switch of a requesting service line to the protection line. To this end, each head-end control unit evaluates each received switch request message to determine whether or not the head-end of a requesting service line is located in the instant office. If so, a switch is effected upon completion of a particular sequence of events. If not, and the head-end control unit is located in an intermediate office, i.e., so-called add-drop office, the switch message in the form of XBITCO signals are transmitted request, in accordance with an aspect of the invention, to the VMR-end switching control of the next upstream protection line protection downstream transmission.

To realize these functions each head-end switching control unit includes logic for detecting and assembling switch request messages, namely, timing unit 1401, logic associated with each service line terminated in the office for determining a head-end comparison and if so to effect head-end switch, namely, per-line logic units 1402-1 through 1402-N, and logic for determining the status of the protection line and if a head-end comparison has been made, namely, decision logic 1403.

Accordingly, balanced XCLK and X-bit signals from a corresponding PVMR unit are supplied to XCLK receiver 1405 and X-bit receiver 1406, respectively, where they are converted to single-ended signals. XCLK signals are supplied to one input of NAND gate 1407 while X-bit signals are supplied to the set S input of flip-flop 1408 and to shift register 1410. Output 1 of flip-flop 1408 is supplied to a second input of NAND gate 1407 while output O is supplied to control signal generator 1411 and to timer 1413. Flip-flop 1408 is employed to respond to the prefix bit, i.e., logical 1 of each incoming switch request message to enble NAND gate 1407 to pass XCLK signals to control signal generator 1411 and to initialize generator 1411, AND gate 1412 and retrigger time 1413. Timer 1413 has a predetermined time interval, for example, 24 seconds. If timer 1413 times-out, i.e., is not retriggered in a 24 second interval, a protection switching failure (PSF) is indicated by LED 1414 being illuminated. Signal HPSCF indicating the protection switching failure is supplied via inverter 1415 to alarm panels and to each of per-line units 1402-1 through 1402-N.

Figure 15:
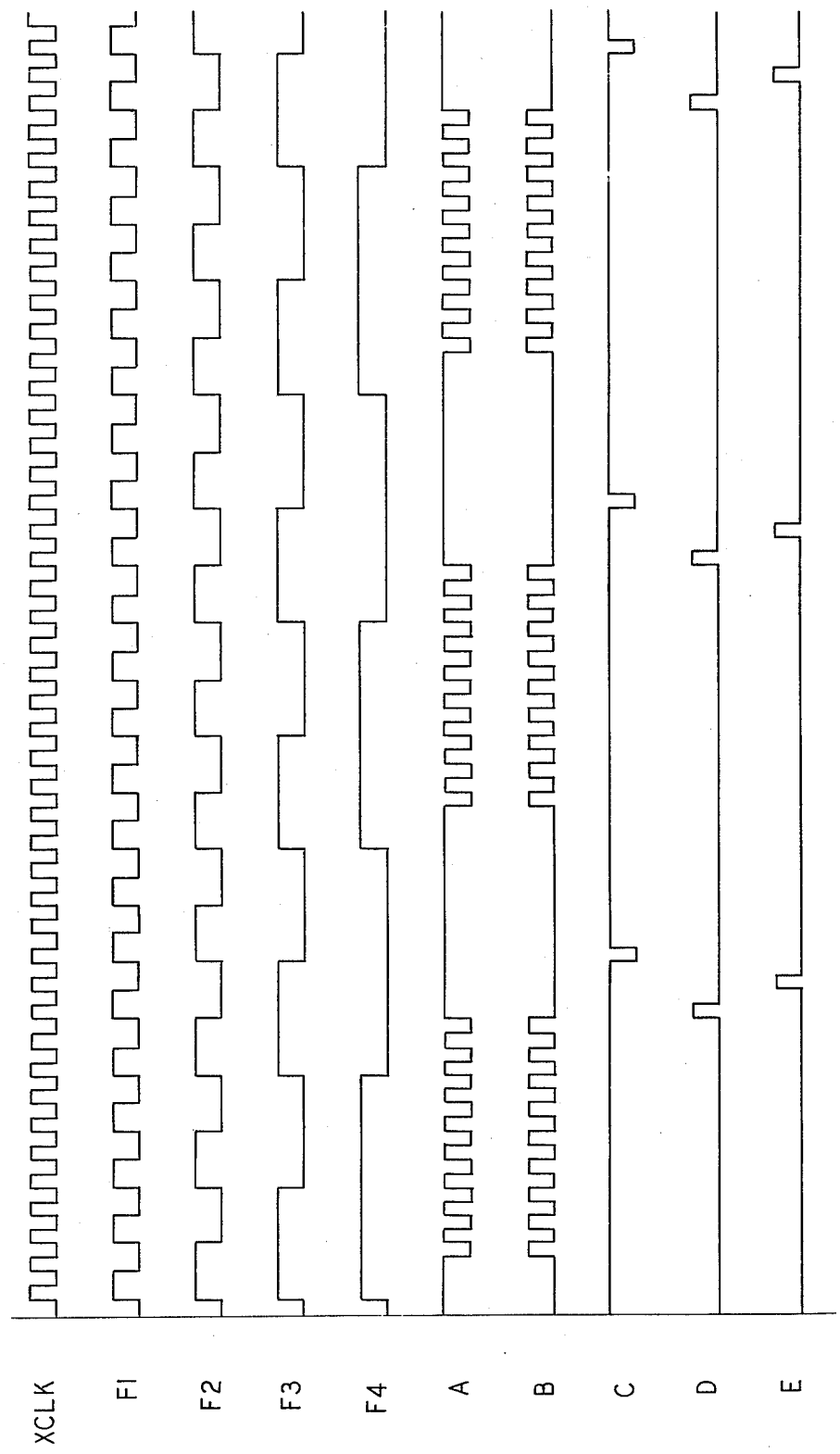
FIG. 15 is a sequence of waveforms useful in describing operation of the head-end switching control of FIG. 14.

Control signal generator 1411 generates a plurality of control signals as graphically illustrated in FIG. 15. Generator 1411 includes, for example, a four-stage count down unit and appropriate logic for decoding the count down output to obtain the desired output control signals. Signals A and C from generator 1411 are supplied to clock input gate 1416 for clocking nine switch request X-bits into register 1410. Signal C is also designated RESCO and in add-drop offices is supplied to a corresponding VMR-end switching control for resetting a clock to effect cross office transmission of X-bits. Signal C is also employed to reset flip-flop 1408. Additionally, cross office XCLKCO signals from the corresponding VMR-end control in add-drop offices are supplied to control clock input gate 1416 only when cross office transmission of X-bits is being effected. The XCLKCO signals are employed to properly synchronize the head-end control with the VMR-end control in add-drop offices.

In operation, for example, when there are no switch requests, a test message should be received every 12 seconds. The 9-bit test switch message has the form 100000001. Flip-flop 1408 responds to prefix bit =0 1 and initializes control signal generator 1411 and AND gate 1412, and retriggers timer 1413. Flip-flop 1408 also enables gate 1407 which, in turn, passes XCLK signals to generator 1411. Outputs from generator 1411, as shown in FIG. 15, are employed to control operation of the head-end control. Signals A and C are supplied to clock input gate 1416 and are employed in conjunction with signal B supplied to register 1410 for clocking the test message bits into register 1410. Signal C is also employed to reset flip-flop 1408 for detecting reception of next message and to control output gate 1417.

Once the 9-bits of the test message are in register 1410, parity calculator 1418 determines whether or not the requisite even parity is present. Again, a logic tree of Exclusive OR gates may be employed for determining parity. The parity calculation is controlled by signal D from generator 1411. If parity is correct, six ID bits LID and message bit DA are supplied in parallel via output buffer 1419 to each of per-line units 1402-1 through 1402-N. If parity is not correct, parity calculator yields an output which is supplied to AND gate 1412 and register 1410 is reset to its initial condition.

The LID bits are compared by LID comparator 1420 in each of per-line units 1402-1 through 1402-N to determine if the head-end of a requesting line is located in the same office as this head-end control unit. Since the instant signal is a test message, no comparison is found. Consequently, the IDLE signal from decision 1403, to be explained below, remains a logical 0 and AND gate 1412 in timing unit 1401 remains disabled. Once the 9th-bit had been clocked into register 1410, signal C resets flip-flop 1408 and enables output gate 1417 and gate 1416 to pass XCLKCO signals to register 1410. In turn, flip-flop 1408 inhibits generator 1411. This indicates to a corresponding VMR-end control unit in an add-drop office, i.e., the next upstream protection line in the downstream protection system, that X-bits are being transmitted cross office. Clock signals for this purpose are received from the VRM-end control, i.e., XCLKCO, and supplied via gate 1416 to advance shift register 1410 so that the bits of the test message, i.e., XBITCO signals, are supplied in synchronism via gate 1417 to a corresponding VMR-end control. In this manner, only a single test message need be transmitted to exercise each protection line of the complete add-drop protection switching system when no switch requests are present.

When a switch request message is received from a service line, timing unit 1401 operates exactly as for the test message. That is, if proper parity is detected, message bit DA and line ID bits LID are supplied to comparator 1420 in each of per-line units 1402. If no comparison is found and the head-end control is in an add-drop office the switch request is transmitted across the office to the next upstream protection line for transmission to the next upstream head-end control in the downstream transmission system. This process is repeated through all of the add-drop offices in the system until the head-end of the requesting service line is found.

Per-line units 1402 are employed to effect a requested head-end switch. Per-line units are provided only for those service lines which are terminated in the office. Operation is explained first, assuming no other service line has been switched, and the requesting line is terminated in the instant office. Then, the LID signals supplied to LID comparator 1420 match those supplied via 912 from a line ID selector and comparator 1420 yields a logical 1 in response to and for the duration of signal E (FIG. 15) from control signal generator 1411. The output from comparator 1420 is supplied to message decoder 1425. Decoder 1425 is merely a plurality of logic gates arranged to be enabled and disabled by a plurality of inputs for yielding prescribed outputs dependent on the states of the inputs. Thus, if no other line has been switched, SMLSW = 0 and if the instant service line has not been switched output 0 of status flip-flop 1426 is a logical 1. Since SMLSW = 0, NAND gate 1427 is disabled and message decoder 1425 yields a change from a logical 1 to a logical 0 at output MSHR-1 for the duration of signal E. MSHR-1 is supplied to clear monostable multivibrator 1428 and to AND gate 1430 in decision unit 1403. DA is the message bit which is a logical 0 when the protection line is available and a logical 1 when busy. Thus, when DA = 1 and comparator 1420 yields an output indicating a line ID match, message decoder 1425 yields output PB-1 = 0, which indicates the protection line is busy. This PB-1 signal is supplied to AND gate 1431 for purposes to be discussed below. When DA = 0 and comparator 1420 yields a logical 0 to 1 transition in response to signal E (FIG. 15) from generator 1411, message decoder 1425 yields output PB-1 = 1 and output MDO = 0. Output PB-1 is essentially identical to signal E from generator 1411, while output MDO is essentially the inverse of signal E. PB-1 = 1 indicates the protection line is not busy. In turn, output PB-1 is supplied to AND gate 1431 in decision unit 1430. Output MDO is supplied to timer 1432 and to inhibit input of NAND gate 1433. Timer 1432 has a predetermined timing interval of, for example, 5 milliseconds. Timer 1432 is triggered by the trailing edge, i.e., 0 to 1 transition of output MDO and, in turn, yields a logical 1 output for the timing interval of 5 milliseconds. The output from timer 1432 is supplied to a second input of NAND gate 1433. Gate 1433 is, therefore, enabled for the timing interval of timer 1432. Consequently, if a second identical switch request is received during the timing interval of timer 1432, the output from NAND gate 1433 changes from a 1 to a 0 and monostable multivibrator 1434 is triggered. Monostable 1434 has a prescribed unstable interval and generates a signal which is supplied to reed relay driver 1435 for a sufficient interval to cause a switch to be made. Thus, a reed relay drive signal for effecting a head-end switch is generated only if two identical switch requests are received within a 5 millisecond interval determined by timer 1432. Reed relay driver 1435 generates COLH-1 which is a positive pulse signal having a sufficient amplitude and interval for causing the contacts of a corresponding reed relay to close and effect the desired head-end switch.

The output from monostable 1434 is also supplied to the set S input of status flip-flop 1426. Status flip-flop 1426 responds to the negative going output from monostable 1434 to yield a logical 1 at output 1 and a logical 0 at output 0. This change of state of flip-flop 1426 causes LED 1436 to be illuminated AND gate 1437 to be enabled, and a logical 0 to be supplied via inverter 1438 indicating a service line has been switched, i.e., LSWH-1, to AND gate 1440 in decision unit 1403. Additionally, the change in output 0 of flip-flop 1426 sets history flip-flop 1439, disables NAND gate 1427 as well as portions of decoder 1425 so that only MSHR-1 signals are generated in response to subsequent switch requests. The MDO output is disabled since the reed relay contacts remain closed until a release signal is generated.

When some other line had been switched as indicated by SMLSW = 1, it is important that the instant head-end switch capability be disabled. Since output 0 from status flip-flop 1426 is a logical 1 and SMLSW = 0, NAND gate 1427 yields a logical 0. This output from gate 1427 disables a gate in decoder 1425 and, consequently, decoder 1425 is inhibited from yielding MSHR signals in response to a match indication from comparator 1420. Additionally, the SMLSW = 1 signal is inverted via inverter 1470 and supplied to disable monostable 1434. Therefore, reed relay driver 1435 is disabled and no reed relay drive signal can be generated.

A release signal is generated in per-line unit 1402-1 when release signal REL-IN is received and monostable 1428 is triggered. Monostable 1428 has a predetermined unstable interval of, for example, 5 milliseconds, which is sufficient to cause a release of the closed reed relay contacts. Since AND gate 1437 is enabled via status flip-flop 1426, gate 1437 yields a positive pulse output which resets status flip-flop 1426 on the trailing edge and causes reed relay driver 1435 to yield a negative pulse at COLH-1 having a sufficient amplitude and interval to cause the reed relay contacts to open. Thus, the head-end switch is dropped. Release signal REL-OUT is also propagated serially through the remaining per-line unit. This is achieved by employing AND gate 1440. HIDLE supplied to gate 1440 is a logical 1 and the output from monostable 1428 during its unstable interval is also a logical 1. Consequently, the output from AND gate 1440 is a logical 1 and changes to a logical 0 when monostable 1428 times-out. In this manner, release pulse REL-OUT is supplied to each subsequent one of per-line units 1402. The release process is repeated every 12 seconds.

Decision unit 1403 is employed to determine when a switch should be released and to generate signals indicating the status of the protection line. AND gate 1430 is supplied with signals MSHR-1 through MSHR-N from per-line unit 1402-1 through 1402-N, respectively. Since the MSHR signals are normally logical 1s and become a logical 0 only in response to a switch request, the output from AND gate 1430 is normally a logical 1 and becomes a logical 0 for the duration of switch request signal MSHR. Thus, when any one of per-line units 1402 indicate a switch request, i.e., MSHR = 0, AND gate 1430 yields a negative pulse. The output from gate 1430 is labeled IDLE and is supplied to AND gate 1450, to the set S input of idle flip-flop 1451 and to an input of AND gate 1412 in timing unit 1401. Gate 1412 responds to the negative IDLE pulse to reset shift register 1410 as discussed above. Similarly, flip-flop 1451 is set to yield a logical 0 which is supplied to one input of NAND gate 1452. Consequently, gate 1452 is disabled and REL-OUT from decision 1403 is a logical 1. Flip-flop 1451 also yields a logical 1 which is inverted via inverter 1453 to yield HIDLE = 0. HIDLE is supplied to AND gate 1440 in each of per-line units 1402 as discussed above.

AND gate 1450, timer 1454 and delay 1455 are employed to generate release signal REL-OUT if no switch request is received within a predetermined interval, for example 24 seconds. The 24 second interval is selected so that the head-end switch is dropped after the VMR-end switch was dropped. Timer 1454 is a retriggerable monostable multivibrator having a prescribed unstable interval of, for example, 12 seconds. During its unstable interval, timer 1454 yields a logical 1 at output Q and a logical 0 at output $\overline{Q}$. Consequently, NAND gate 1452 is disabled during intervals in which timer 1454 is in its unstable state. Timer 1454 is triggered via AND gate 1450 when IDLE goes from a 1 to a 0. If no match indication, i.e., no switch request is received for more than 12 seconds timer 1454 times-out yielding Q = 0 and $\overline{Q}$ = 1. The change in output Q is supplied to delay 1455 which delays resetting idle flip-flop 1451 for a prescribed interval, for example, 0.2 milliseconds. NAND gate 1452 is disabled during this interval. The logical 0 Q output from timer 1454 is supplied to an input of AND gate 1450. Consequently, gate 1450 is disabled yielding a negative going output which triggers timer 1454 and $\overline{Q}$ = 0 and Q = 1 again. Since resetting of flip-flop 1451 was delayed NAND gate 1452 did not yield a negative pulse. However, gate 1452 was enabled after the delay interval had terminated. Now if no switch request is received during the next 12 second interval, timer 1454 times-out and output $\overline{Q}$ becomes a logical 1. In turn, NAND gate 1452 responds to output $\overline{Q}$ to yield negative release pulse REL-OUT. REL-OUT is supplied to trigger monostable 1428 in per-line unit 1402-1 as described above. This operation of decision unit 1403 insures that the head-end switch is dropped after the VMR-end switch has been dropped. It should also be noted that release signal REL-OUT is generated when a switch request is absent for a prescribed interval and that no designated switch release control signal is required from the VMR-end.

AND gate 1431 is employed to combine all protection line busy signals PB-1 through PB-N into a single output PB. Output PB is supplied to the set (S) input of protection busy flip-flop 1460 in timing unit 1401. When a protection line busy indication is received from one of per-line units 1402, flip-flop 1460 is set and LED 1461 is illuminated indicating the busy status. Additionally, protection busy signal PRTBSY is supplied via inverter 1462 to provide a remote protection line busy indication. Flip-flop 1460 is reset either manually or remotely by applying RESET to reset input R.

AND gate 1440 is employed to combine all of line switched signals LSWH-1 through LSWH-N from per-line units 1402-1 through 1402-N, respectively. Normally, the output of gate 1440 is a logical 1 which indicates no line has been switched. When one of the LSWH signals is a logical 0 the output from gate 1440 changes from a 1 to a 0 indicating that some line has been switched (SMLSW). This SMLSW output is inverted via inverter 1465 and supplied to NAND gate 1427 in each of per-line units 1402 for purposes as described above. This SMLSW output from AND gate 1440 also sets history flip-flop 1466 and LED 1467 is illuminated. The output from flip-flop 1466 is inverted via inverter 1467 and supplied as COMHIS to a remote location to indicate the status of the protection line. History flip-flop 1466 is also reset either manually or remotely by an appropriate signal RESET being supplied to reset input R.

The above-described arrangements are, of course, merely illustrative of the application of the principles of the invention. Numerous other arrangements may be devised by those skilled in the art without departing from the spirit and scope of the invention. For example, the invention may readily be expanded to a system which employs more than one protection line for each direction of transmission between each office. This may be achieved by employing a number of message bits equal to the number of protection lines between each office. The message bits indicate the status of each protection line. Then, any of the available protection lines are advantageously cascaded to protect a failed service line substantially as described above.

What is claimed is:

1. In a communications system including a plurality of offices linked in a sequence by a plurality of protection lines connected in series, a first office including a transmit terminal, a second office including a receive terminal, one or more offices intermediate the first and second offices each including a transmit terminal and a receive terminal, regular service lines linking ones of the offices directly with others of the offices, wherein one or more of the service lines bypass one or more of the intermediate offices, an arrangement for controllably cascading ones of the serially connected protection lines to provide protection for service lines which bypass one or more of the intermediate offices, comprising:

means located at each receive terminal and being associated with each service line terminated in the receive terminal for generating a protection switch request message, said protection switch request message including the identity of the requesting service line and status of the protection line incoming to the receive terminal;

means located at each receive terminal for controllably effecting a receive-end switch from a requesting service line to a protection line;

means for supplying said protection switch request message from the receive terminal including the requesting service line sequentially to each office in the serial sequence prior to the office including the receive-end of the service line requesting the protection switch, said supplying means including means located at each transmit terminal for evaluating the switch message to determine whether the requesting line originates in that office and to determine whether the protection lines to be cascaded are available; and means located at each transmit terminal for controllably effecting a transmit-end switch from the requesting line to a protection line outgoing from the transmit terminal, wherein the protection switch request message is supplied from the receive-end of the requesting line sequentially to all offices prior in the serial sequence until the transmit-end of the requesting line is located and a protection switch is effected dependent on the availability of the protection lines to be cascaded.

2. An arrangement as defined in claim 1 further including means located at each intermediate office in the system for selectively modifying the protection line status indication of the protection switch request messages supplied thereto from requesting service lines not originating in the intermediate office when the protection line incoming to the office is not available, said modifying means being arranged so that the protection line status indication of switch request messages incoming to the office is not modified when the protection line incoming to the receive terminal in that office is available.

3. An arrangement as defined in claim 1 further including means located at each transmit terminal for directly supplying to the next associated receive terminal in the serial sequence of offices protection switch request messages from requesting lines not originating at the transmit terminal.

4. An arrangement as defined in claim 3 wherein each receive terminal further includes means for selectively modifying the protection line status indication of protection switch request messages supplied directly from an associated transmit terminal when the protection line incoming to the receive terminal is not available, said modifying means being arranged so that the status of others of the protection lines to be cascaded presently indicated by a directly supplied protection switch request message is not modified if the protection line incoming to the receive terminal is available for use.

5. An arrangement as defined in claim 4 wherein each transmit terminal includes means for initiating a direct transfer of a protection switch request message to an associated receive terminal and wherein said receive terminal includes means for supplying signals to said associated transmit terminal for synchronizing said associated transmit and receive terminals and for effecting the transfer of the protection switch request message.

6. An arrangement as defined in claim 5 wherein said transmit-end switching means includes means responsive to the protection switch request messages identifying service lines originating at the transmit terminal to inhibit a transmit-end switch from a requesting service line to the protection line when the switch request message indicates that one of the protection lines to be cascaded is not available.

7. An arrangement as defined in claim 6 wherein said receive-end switching means includes means responsive to a change in a prescribed characteristic of a signal being propagated over the protection lines cascaded between the transmit-end and receive-end of the requesting service line to effect a receive-end switch from the requesting service line to the protection line, wherein the change in said prescribed characteristic indicates that a transmit-end switch has been made.

8. An arrangement as defined in claim 7 further including means for controllably inserting a predetermined signal at the receive-end of each service line and each protection line in the system during intervals in which prescribed undesirable characteristics are observed of signals being transmitted on said lines, said inserted signal being supplied to subsequent downstream equipment during intervals in which a protection line has not been substituted for the lines in which said predetermined signal has been inserted.

9. In a bidirectional communications system wherein each direction of communications includes a first office having a first transmit terminal, a second office having a first receive terminal, one or more offices intermediate the first and second offices each having a transmit terminal and a receive terminal, all of the offices in each direction of communications being linked in a sequence by a serial connection of a plurality of protection lines, regular service lines linking ones of the offices directly with others of the offices, wherein one or more of the regular service lines by-pass one or more of the intermediate offices, an arrangement for controllably cascading appropriate ones of the protection lines in the serial sequence to provide protection for the one or more service lines which by-pass one or more of the intermediate offices comprising:

means located at each receive terminal and being associated with each service line terminated in the receive terminal for generating a protection switch request message, said protection switch request message including the identity of the requesting service line and status of the protection line incoming to the receive terminal;

means located at each receive terminal for controllably effecting a receive-end switch from a requesting service line to a protection line;

means for supplying said protection switch request message from the receive terminal including the requesting service line sequentially to each office in the serial sequence prior to the office including the receive-end of the service line requesting the protection switch, said supplying means including means located at each transmit terminal for evaluating the switch message to determine whether the requesting line originates in that office and to determine whether the protection lines to be cascaded are available; and means located at each transmit terminal for controllably effecting a transmit-end switch from the requesting line to a protection line outgoing from the transmit terminal, wherein the protection switch request message is supplied from the receive-end of the requesting line sequentially to all offices prior in the serial sequence until the transmit-end of the requesting line is located and a protection switch is effected dependent on the availability of the protection lines to be cascaded.

10. An arrangement as defined in claim 9 wherein said supplying means includes means located at each office and associated with the receive terminal for inserting the protection switch request messages into the signal normally being transmitted over the protection lines employed in a direction of communications opposite to that of the service lines being protected and means located at each office and associated with the transmit terminal for removing the protection switch request messages from the signal being transmitted over the opposite direction protection line.

11. An arrangement as defined in claim 10 wherein each transmit terminal includes means for directly supplying to an associated receive terminal in the same intermediate office protection switch request messages from service lines not originating at the transmit terminal.

12. An arrangement as defined in claim 11 wherein each receive terminal includes means for selectively modifying the protection line status indication of the directly supplied protection switch request messages when the protection line incoming to the receive terminal is not available, said modifying means being arranged so that the protection line status indication of the directly supplied switch request messages is not modified when the protection line incoming to the receive terminal is available.

13. An arrangement as defined in claim 12 wherein each transmit terminal includes means for initiating a direct transfer to an associated receive terminal of protection switch request messages from service lines not originating at the transmit terminal and wherein the associated receive terminal includes means responsive to signals from said associated transmit terminal for supplying signals to said transmit terminal for synchronizing said associated terminals and for effecting the direct transfer of the protection switch request messages.

14. An arrangement as defined in claim 13 wherein the signals being transmitted over the service lines and protection lines are digital and the protection switch request message has a plurality of bits including an address of a request service line and the status of the protection lines to be cascaded and wherein said inserting means includes multiplexer means for inserting the bits of the protection switch request messages into prescribed bit positions of the digital signal being transmitted over the opposite direction protection lines and said removing means includes demultiplexer means for obtaining the bits of the protection switch request messages from the prescribed bit positions of the digital signal being transmitted over the opposite direction protection line.

15. An arrangement as defined in claim 13 further including means for controllably inserting a predetermined signal at the receive-end of each service line and each protection line in the system during intervals in which prescribed undesirable characteristics are observed of signals being transmitted on said lines, said inserted signal being supplied to subsequent downstream equipment during intervals in which a protection line has not been substituted for the lines in which said predetermined signal has been inserted.

* * * * *